United States Patent
Nakagawa et al.

(10) Patent No.: US 10,479,082 B2
(45) Date of Patent: Nov. 19, 2019

(54) INK JET RECORDING METHOD AND INK JET RECORDING APPARATUS

(71) Applicant: CANON KABUSHIKI KAISHA, Tokyo (JP)

(72) Inventors: Kouhei Nakagawa, Tokyo (JP); Arihiro Saito, Saitama (JP); Takashi Saito, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/027,506

(22) Filed: Jul. 5, 2018

(65) Prior Publication Data
US 2019/0009544 A1 Jan. 10, 2019

(30) Foreign Application Priority Data

Jul. 7, 2017 (JP) .................................. 2017-133624
Jun. 13, 2018 (JP) .................................. 2018-112735

(51) Int. Cl.
| | |
|---|---|
| *B41J 2/155* | (2006.01) |
| *C09D 11/102* | (2014.01) |
| *B41J 2/14* | (2006.01) |
| *C09D 11/322* | (2014.01) |
| *B41J 2/175* | (2006.01) |
| *B41J 2/18* | (2006.01) |
| *C09D 11/324* | (2014.01) |

(52) U.S. Cl.
CPC ............ *B41J 2/155* (2013.01); *B41J 2/1404* (2013.01); *B41J 2/14016* (2013.01); *B41J 2/14201* (2013.01); *B41J 2/175* (2013.01); *B41J 2/18* (2013.01); *C09D 11/102* (2013.01); *C09D 11/322* (2013.01); *B41J 2002/14403* (2013.01); *B41J 2202/11* (2013.01); *B41J 2202/12* (2013.01); *B41J 2202/20* (2013.01); *B41J 2202/21* (2013.01); *C09D 11/324* (2013.01)

(58) Field of Classification Search
CPC ....... C09D 11/38; C09D 11/30; C09D 11/322; C09D 11/326; B41J 2/01
USPC .............................................. 347/40, 95, 100
See application file for complete search history.

(56) References Cited

U.S. PATENT DOCUMENTS

| | | | |
|---|---|---|---|
| 7,128,406 B2 | 10/2006 | Dixon et al. | |
| 7,276,112 B2 | 10/2007 | Tokuda et al. | |
| 9,388,322 B2 | 7/2016 | Kakikawa et al. | |

(Continued)

FOREIGN PATENT DOCUMENTS

| | | |
|---|---|---|
| JP | H11-100406 A | 4/1999 |
| JP | 2007-118611 A | 5/2007 |

*Primary Examiner* — An H Do
(74) *Attorney, Agent, or Firm* — Venable LLP

(57) ABSTRACT

An ink jet recording method capable of recording a high-quality image in which occurrence of fine unevenness is decreased. The ink jet recording method includes recording an image by ejecting ink from a recording head including an ejection orifice for ejecting the ink, an ejection element generating energy for ejecting the ink, and first and second flow paths that communicate between the ejection orifice and the ejection element and in which the ink flows. The ink jet recording method includes an ejection step of ejecting the ink from the ejection orifice, and a flow step of flowing the ink from the first flow path to the second flow path separately from the ejection step. The ink is an aqueous ink having a dynamic surface tension of 35 mN/m or more to 48 mN/m or less at 10 milliseconds.

20 Claims, 9 Drawing Sheets

(56) References Cited

U.S. PATENT DOCUMENTS

| | | | |
|---|---|---|---|
| 9,598,592 B2 | 3/2017 | Nakata et al. | |
| 9,605,170 B2 | 3/2017 | Nakagawa et al. | |
| 9,895,901 B2 | 2/2018 | Saito et al. | |
| 2017/0297347 A1* | 10/2017 | Torisaka | B41J 2/0057 |
| 2018/0093469 A1* | 4/2018 | Sakurada | C09D 11/322 |
| 2018/0134907 A1 | 5/2018 | Saito et al. | |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Recently, ink jet recording apparatuses are increasingly used in office printing and commercial printing fields. Further, in the ink jet recording apparatus, there is a need to further increase a recording speed. In order to increase the recording speed, an ink jet recording method of recording an image in single pass by using a line type recording head (line head) is advantageous as compared to a multi-pass recording method performed using a serial type recording head according to the related art.

However, due to a configuration of the apparatus, the line head has a feature that it is difficult to perform a recovery operation from a nozzle in which ejection from a nozzle is paused or from a nozzle with a low ejection frequency. Particularly, even though there are nozzles with a low ejection frequency, it may be difficult to perform a preliminary ejection operation for preventing deterioration of ejection performance due to thickening of ink.

Meanwhile, in the case of recording an image in single pass by using the line head, since a difference in ejection volume between nozzles easily affects the image quality, there is a need to further improve the ejection stability of ink. For example, a recording head having a mechanism for flowing ink in the vicinity of an ejection orifice in order to suppress foreign materials from remaining in the nozzle has been suggested (Japanese Patent Application Laid-Open No. 2007-118611).

SUMMARY OF THE INVENTION

The present inventors investigated a case of recording an image in single pass by using a line head adopting the mechanism for flowing ink in the vicinity of the ejection orifice, suggested in Japanese Patent Application Laid-Open No. 2007-118611, in order to further increase a recording speed. As a result, it was found that intermittent ejection stability of the ink can be improved. However, it was found that even in the case of using the line head adopting the mechanism suggested in Japanese Patent Application Laid-Open No. 2007-118611, there is a problem that fine unevenness may occur in a solid image recorded at a high speed depending on the characteristics of ink.

An object of the present invention is to provide an ink jet recording method capable of recording a high-quality image in which occurrence of fine unevenness is decreased. Another object of the present invention is to provide an ink jet recording apparatus used in the ink jet recording method described above.

That is, according to the present invention, there are provided an ink jet recording method of recording an image by ejecting ink from a recording head including an ejection orifice ejecting the ink, an ejection element generating energy for ejecting the ink, and first and second flow paths which communicate between the ejection orifice and the ejection element and in which the ink flows, the ink jet recording method including: an ejection step of ejecting the ink from the ejection orifice; and a flow step of flowing the ink in the first flow path to the second flow path separately from the ejection step, wherein the ink is aqueous ink having a dynamic surface tension of 35 mN/m or more to 48 mN/m or less at 10 milliseconds.

According to the present invention, an ink jet recording method capable of recording a high-quality image in which occurrence of fine unevenness is decreased can be provided. Further, according to the present invention, the ink jet recording apparatus used in the ink jet recording method described above can be provided.

Further features of the present invention will become apparent from the following description of exemplary embodiments with reference to the attached drawings.

DESCRIPTION OF THE EMBODIMENTS

Hereinafter, the present invention will be described in detail with reference to preferred embodiments thereof. In the present invention, when a compound is a salt, in the ink, the salt is dissociated into ions, but for convenience, this ink is expressed as "containing a salt". Aqueous ink for ink jet is also simply referred to as "ink". The first and second flow paths are also collectively referred to as "flow paths". Unless otherwise described, physical properties values are values at room temperature (25° C.).

<Ink Jet Recording Method and Ink Jet Recording Apparatus>

An ink jet recording apparatus according to the present invention includes a recording head including an ejection orifice ejecting the ink, an ejection element generating energy for ejecting the ink, and first and second flow paths which communicate between the ejection orifice and the ejection element and in which the ink flows. Further, the ink jet recording apparatus according to the present invention includes a flowing unit flowing the ink in the first flow path to the second flow path separately from the ejection element. Further, the ink jet recording method according to the present invention is, for example, a method of recording an image by ejecting ink from the recording head using the ink jet recording apparatus described above. That is, the ink jet recording method according to the present invention includes an ejection step of ejecting the ink from the ejection orifice, and a flow step of flowing the ink in the first flow path to the second flow path, separately from the ejection step.

Figure 1:
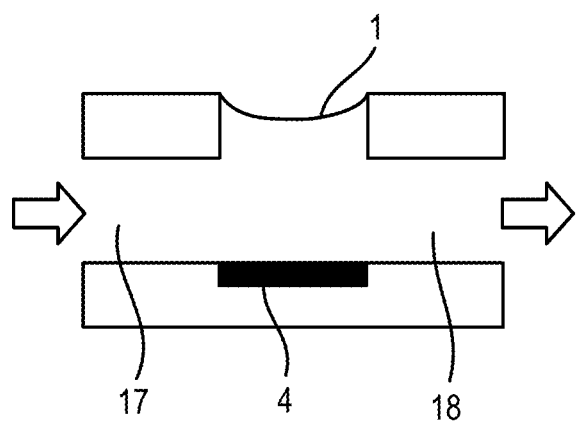
FIG. 1 is a schematic view illustrating an example of a recording head.

FIG. 1 is a schematic view illustrating an example of a recording head. The recording head illustrated in FIG. 1 includes an ejection orifice 1 ejecting ink, an ejection element 4 generating energy for ejecting the ink, and first and second flow paths 17 and 18 which communicate between the ejection orifice 1 and the ejection element 4 and in which the ink flows. The ink flows from the first flow path 17 to the second flow path 18 (in an arrow direction in FIG. 1) while passing between the ejection orifice 1 and the ejection element 4. When the ink is not flowing, evaporation of water from a meniscus of the ejection orifice 1 proceeds, and thus the ink existing between the ejection orifice 1 and the ejection element 4 is slowly thickened. For this reason, when an ejection pause time is long, at the time of performing a next ejection operation, fluid resistance of the ink increases, and thus it may be difficult to eject the ink. On the contrary, when the ink is flowing in the arrow direction in FIG. 1, even in the case in which water is evaporated from the meniscus, since the ink is continuously supplied between the ejection orifice 1 and the ejection element 4 due to a circulation flow, thickening of the ink is suppressed and it is difficult to generate a state in which ejection is difficult.

As described above, intermittent ejection stability of the ink, which corresponds to a problem particularly in the case of using a line head, can be improved by performing the flow step of flowing the ink in the first flow path 17 to the second flow path 18, separately from the ejection step of ejecting the ink from the ejection orifice 1. However, it was found that even in the case of performing the flow step as described above, there is a new problem in that fine unevenness may occur in an image recorded at a high speed in single pass depending on characteristics of the ink. As a result of studying factors causing fine unevenness in the image as described above, it was found that the following two phenomena are the factors.

A first factor is that an ejection volume of the ink from nozzles with a high ejection frequency decreases and a dot diameter becomes non-uniform, and it can be appreciated that the non-uniformity that has occurred is recognized as the fine unevenness. According to the related art, it has been known that when an ejection frequency is different between the nozzles, as the thickening of the ink proceeds, an ejection volume of the ink from a nozzle with a low ejection frequency relatively decreases. On the contrary, the decrease in the ejection volume found in the present invention occurs in the nozzle with a high ejection frequency, which is different from the phenomenon known in the art. The decrease in the ejection volume found in the present invention is a phenomenon specifically occurring in an ink jet recording method having a flow step of ink, and the present inventors estimated that the phenomenon occurs due to the following mechanism.

Figure 2A:
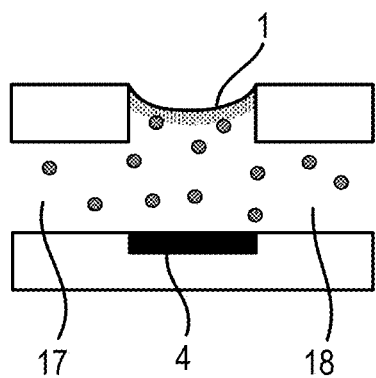
FIG. 2A is a schematic view for explaining a flow state of ink in the recording head.
Figure 2C:
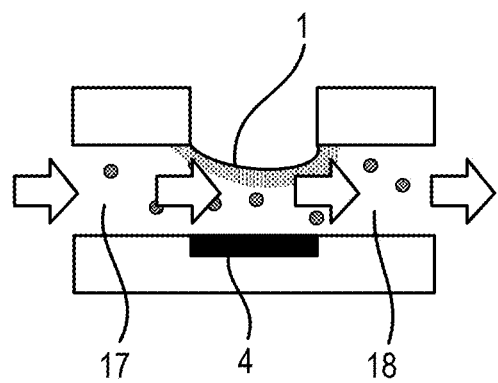
FIG. 2C is a schematic view for explaining the flow state of the ink in the recording head.
Figure 2B:
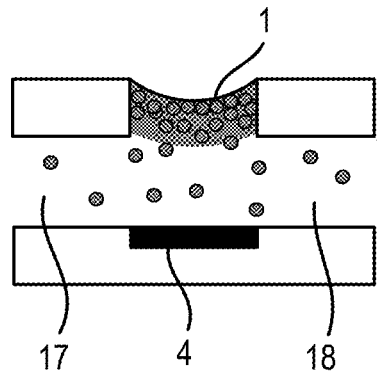
FIG. 2B is a schematic view for explaining the flow state of the ink in the recording head.

FIGS. 2A to 2D are schematic views for explaining a flow state of the ink in the recording head. FIG. 2A is a schematic view illustrating a state of a nozzle having a high ejection frequency of the ink and a short ejection pause time. FIG. 2B is a schematic view illustrating a state of a nozzle having a low ejection frequency of the ink and a long ejection pause time. In FIG. 2A, since an evaporation amount of water is relatively smaller than that in FIG. 2B, thickening of the ink in the vicinity of the meniscus is less likely to proceed, and a thickened substance formed by drying is frequently discharged by ejection. Therefore, since an amount of the thickened substance remaining in the vicinity of the meniscus is small and a viscosity of the ink is low, it is considered that the meniscus is in a state in which the meniscus is easily changed. On the contrary, in FIG. 2B, the ink is easily thickened by evaporation of water, and at the same time, a discharge frequency of the thickened substance is also low. Therefore, the thickened substance is likely to remain in the vicinity of the meniscus, and the viscosity of the ink is also increased, such that it is considered that the meniscus is in a state in which the meniscus is less likely to be changed.

Figure 2D:
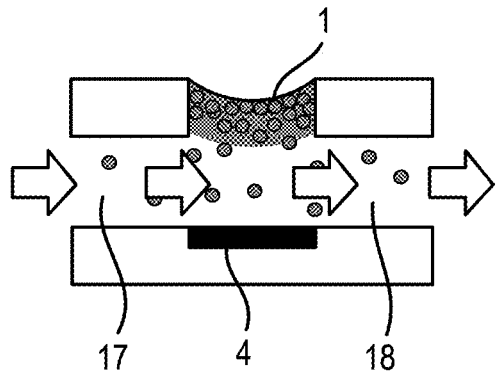
FIG. 2D is a schematic view for explaining the flow state of the ink in the recording head.

FIGS. 2C and 2D illustrate cases in which there is a flow of the ink illustrated in FIGS. 2A and 2B, respectively. When the ink flows in the arrow direction in FIGS. 2C and 2D, in FIG. 2C, the meniscus is likely to be retracted toward the inside of a liquid chamber more than in FIG. 2D. Therefore, an amount of the ink existing between the ejection orifice 1 and the ejection element 4 is relatively decreased in FIG. 2C. When the ink is ejected in this state, an ejection volume of the ink in FIG. 2C is relatively smaller than that in FIG. 2D, such that a dot to be formed is also decreased. As described above, it is considered that in the case of recording a solid image in single pass at a high speed using the line head as described above, since the ejection frequency of the ink is different depending on each of the nozzles, the ejection volume of the ink is also non-uniform, such that non-uniformity of the dot diameter is recognized as fine unevenness.

The present inventors focused on and studied various physical properties of ink in order to solve problems newly occurring in the recording method including the flow step of the ink. As a result, it was found that it is possible to record a high quality image in which occurrence of fine unevenness is decreased by using aqueous ink having dynamic surface tension of 35 mN/m or more at 10 milliseconds. Even in a situation in which the meniscus is likely to be retracted inside, a sufficiently stable meniscus can be formed due to capillary force by allowing the ink to have dynamic surface tension of 35 mN/m or more at 10 milliseconds. Therefore, fine unevenness occurring due to a decrease in ejection volume of the ink can be suppressed. When the dynamic surface tension of the ink at 10 milliseconds is less than 35 mN/m, it is difficult to form a stable meniscus in a situation in which the meniscus is likely to be retracted inside. Therefore, the ejection volume of the ink from a nozzle on which the stable meniscus is not formed is decreased, such that the fine unevenness is likely to occur in the image.

The reason why physical properties of the ink are specified by dynamic surface tension at 10 milliseconds is as follows. In relation to the above-mentioned mechanism, there is a need to grasp surface tension in the situation in which the meniscus is likely to be retracted inside, that is, a state close to a point in time at which movement of the ink is largest. Meanwhile, in the case of dynamic surface tension at a point in time at which a lifetime is excessively short, for example, at 1 millisecond, it may be difficult to obtain a sufficiently reliable measurement value due to the measurement principle of a maximum bubble pressure method, but a highly precise measurement value is obtained at 10 milliseconds. For these reasons, in the present invention, dynamic surface tension at 10 milliseconds is used.

A second factor is that spreading of the dot on a recording medium is insufficient, and it can be appreciated that a portion in which the ink did not spread was recognized as streaky unevenness. As described above, a decrease in ejection volume of the ink due to retraction of the meniscus is suppressed by allowing the ink to have dynamic surface tension of 35 mN/m or more at 10 milliseconds. However, when the dynamic surface tension of the ink at 10 milliseconds is excessively high, wettability of the ink to the recording medium is deteriorated, and spreading of the dot is decreased. The present inventors estimated that for this reason, the portion in which the ink did not spread was recognized as streaky unevenness. This phenomenon remarkably occurs in a case in which a solid image is recorded at a high speed in single pass using a line head on a recording medium where wet spreading of the ink is difficult.

The present inventors further investigated in order to solve the above-mentioned problems. As a result, it was found that it is possible to record a high quality image in which occurrence of streaky unevenness is decreased by using aqueous ink having dynamic surface tension of 48 mN/m or more at 10 milliseconds. The dynamic surface tension of the ink at 10 milliseconds is set to 48 mN/m or less, such that even in the case in which an image is recorded at a high speed in single pass on a recording medium where wet spreading of the ink is difficult using a line head, the recording medium is easily wet with the ink. Therefore, the streaky unevenness is decreased, such that a high-quality image can be recorded.

In summary, in a recording method in which a flow step of the ink is performed, it is important to use aqueous ink having dynamic surface tension of 35 mN/m or more to 48 mN/m or less at 10 milliseconds. Therefore, it is possible to improve wettability of the ink to the recording medium while suppressing a decrease in ejection volume of the ink due to retraction of the meniscus, such that the high-quality image in which occurrence of fine unevenness is decreased can be recorded.

Figure 3:
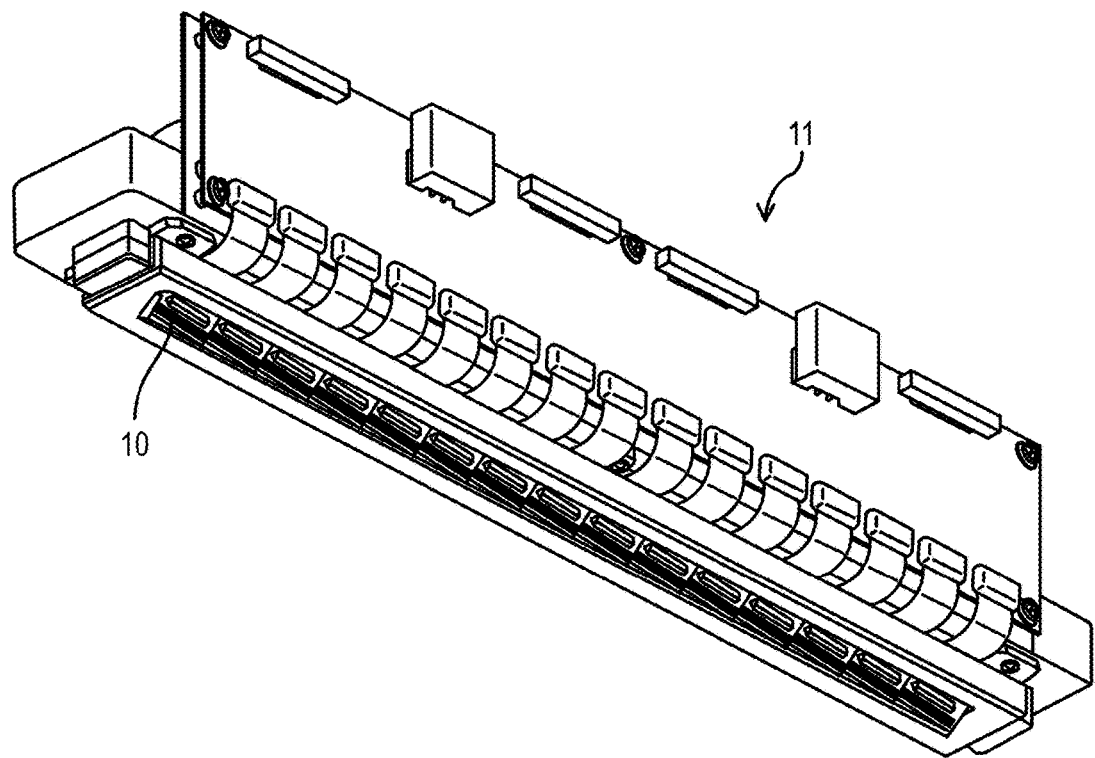
FIG. 3 is a perspective view illustrating an example of a line head.

FIG. 3 is a perspective view illustrating an example of a line head. As illustrated in FIG. 3, an ejection element substrate 10 in which ejection orifice arrays are disposed is arranged in a linear shape in the line head 11. In the ejection element substrate 10, for example, ejection orifice arrays corresponding to respective inks such as cyan, magenta, yellow and black (CMYK) inks are arranged.

Figure 4:
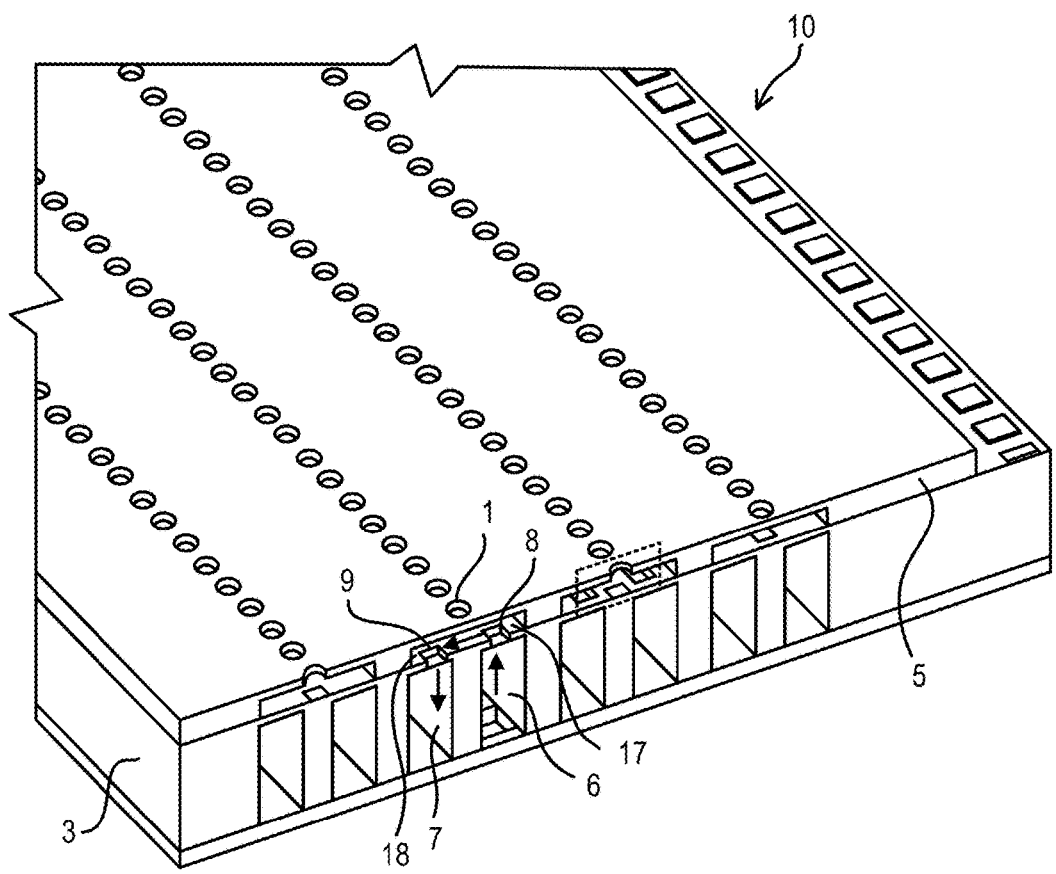
FIG. 4 is a perspective view illustrating a cross section of an ejection element substrate.

FIG. 4 is a perspective view illustrating a cross section of the ejection element substrate. As illustrated in FIG. 4, the ejection element substrate 10 includes an ejection orifice formation member 5 in which the ejection orifice 1 is formed and a substrate 3 in which the ejection element (not illustrated) is disposed. The ejection orifice formation member 5 and the substrate 3 are stacked, such that the first and second flow paths 17 and 18 in which the ink flows are formed. The first flow path 17 is a region from an inlet 8 through which the ink in an inlet path 6 is introduced to a portion between the ejection orifice 1 and the ejection element. Further, the second flow path 18 is a region from the portion between the ejection orifice 1 and the ejection element to an outlet 9 through which the ink is discharged to an outlet path 7. For example, when there is a difference in pressure between the inlet 8 and the outlet 9 such as an inlet 8 having a high pressure and an outlet 9 having a low pressure, the ink can flow from a portion at which the pressure is high to a portion at which the pressure is low (in an arrow direction in FIG. 4). The ink that passed through the inlet path 6 and the inlet 8 goes into the first flow path 17. In addition, the ink that passed through the portion between the ejection orifice 1 and the ejection element flows to the outlet path 7 through the second flow path 18 and the outlet 9.

The flow step of flowing the ink in the first flow path to the second flow path is a separate (different) step from the ejection step of ejecting the ink from the ejection orifice. Further, it is preferable that a flow of the ink from the first flow path to the second flow path in the flow step is performed separately from filling of the ink between the ejection orifice and the ejection element. It is preferable that the flow step is a step of flowing the ink in the first flow path to the second flow path without discharging the ink from the ejection orifice. Discharge of the ink from the ejection orifice includes recovery operations such as preliminary ejection or suction. During a recovery action of the recording head, a flow of the ink from the first flow path to the second flow path may be stopped. Further, in the flow step, it is preferable to flow the ink from the first flow path to the second flow path by a flowing unit separately from the ejection element.

Hereinafter, a case of using a thermal type recording head generating bubbles to eject ink using an ejection element generating thermal energy will be described by way of example in order to describe the ink jet recording method and the ink jet recording apparatus according to the present invention in more detail. However, a piezo type recording head, or a recording head adopting another ejection method can also be applied to the ink jet recording method and the ink jet recording apparatus according to the present invention. Hereinafter, a case in which the ink is circulated between an ink storage portion and the recording head is described by way of example, but another case may also be applied. For example, two ink storage portions may be provided on upstream and downstream sides of the recording head, and ink may flow from one ink storage portion to another ink storage portion. Further, a line head in which the ejection element substrate capable of ejecting four color inks (CMYK) is linearly arranged will be described by way of example, but a line head in which ejection element substrates corresponding to four color inks, respectively, are provided can also be used. In addition, as a recording head other than the line head, a serial head recording an image while scanning can also be used. In the present invention, it is particularly preferable to use the line head ejecting ink in a thermal method.

Figure 5:
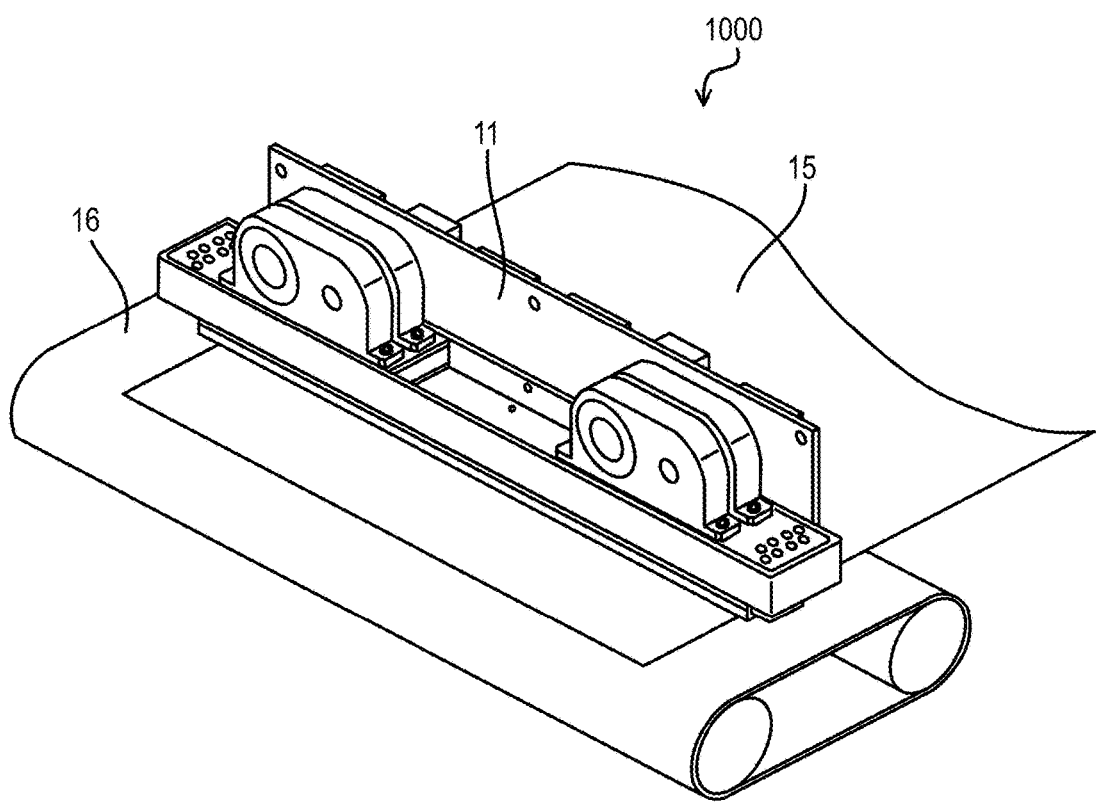
FIG. 5 is a perspective view illustrating main portions of an ink jet recording apparatus.

FIG. 5 is a perspective view illustrating main portions of an ink jet recording apparatus. An ink jet recording apparatus 1000 illustrated in FIG. 5 includes a conveyance portion 16 conveying a recording medium 15 and a line head 11 disposed to be orthogonal to a conveyance direction of the recording medium. The ink jet recording apparatus 1000 includes a line head 11 recording an image while continuously or intermittently conveying a plurality of recording media 15. As the recording medium 15, roll paper as well as cut paper can also be used. Among them, paper having permeability, for example, a recording medium having no coating layer such as plain paper or non-coated paper and a recording medium having a coating layer such as a glossy paper or an art paper is preferably used.

Figure 6:
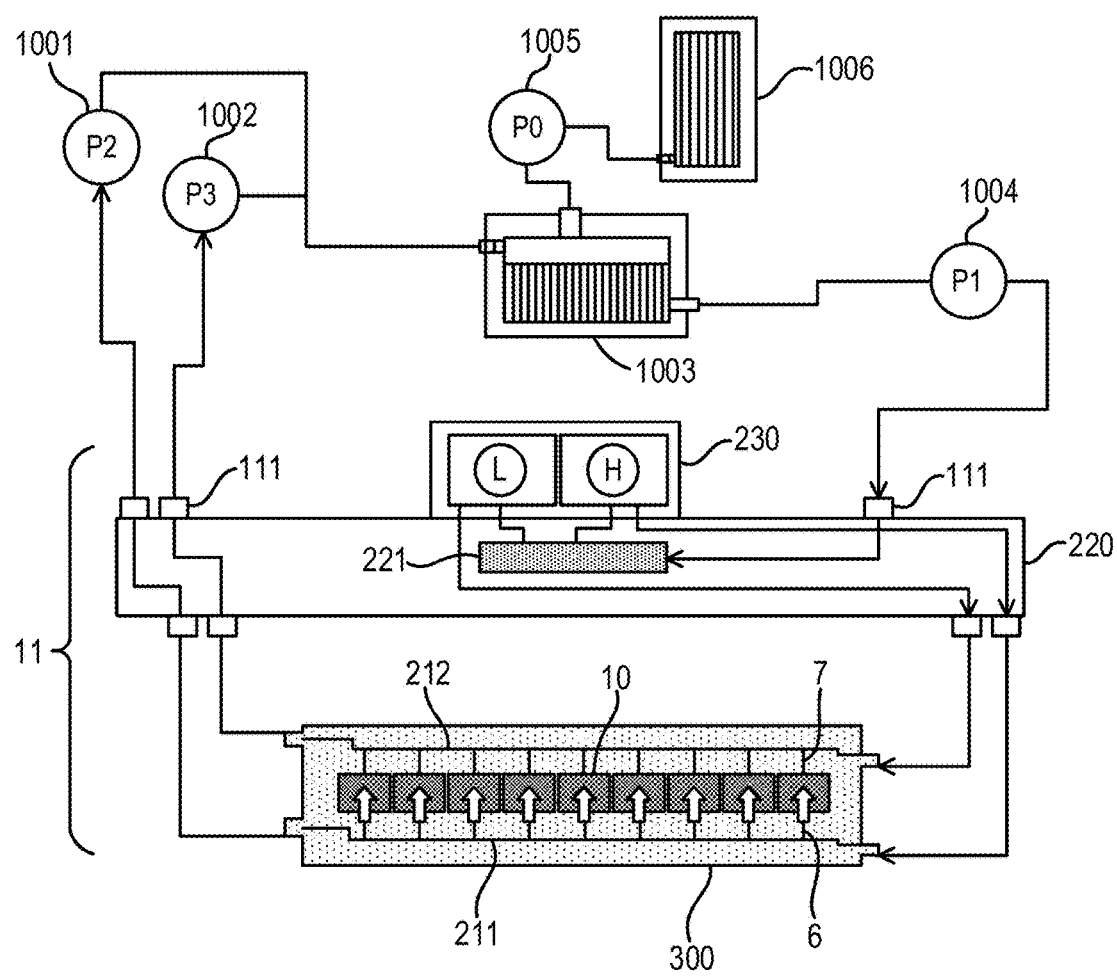
FIG. 6 is a schematic view illustrating a supply system of ink.

In the flow step, it is preferable to continuously or intermittently flow the ink. Hereinafter, a method of continuously or intermittently flowing the ink will be described in detail. First, the method of continuously flowing the ink will be described with reference to FIG. 6. FIG. 6 is a schematic view illustrating a supply system of ink. A line head 11 illustrated in FIG. 6 is connected to a first circulation pump (high pressure side) 1001, a first circulation pump (low pressure side) 1002, a buffer tank 1003 and a second circulation pump 1004. Although only a flow path for one color ink is illustrated in FIG. 6 in order to simplify the description, actually, flow paths for four colors of CMYK are provided in the line head 11, respectively.

The buffer tank 1003 connected to a main tank 1006 corresponding to the ink storage portion has an air circulation hole (not illustrated) and can discharge bubbles in the ink to the outside. The buffer tank 1003 is also connected to a replenishment pump 1005. The ink is ejected (discharged) from the ejection orifice at the time of image recording and suction recovery, such that the ink is consumed in the line head 11. The replenishment pump 1005 conveys an amount of ink corresponding to a consumption amount from the main tank 1006 to the buffer tank 1003.

The first circulation pump (high pressure side) 1001 and the first circulation pump (low pressure side) 1002 flow the ink in the line head 11 discharged from a liquid connection portion 111 to the buffer tank 1003. As the first circulation pump, it is preferable to use a positive displacement pump having quantitative liquid pumping capacity. Specific examples of this positive displacement pump can include a tube pump, a gear pump, a diaphragm pump, a syringe pump and the like. At the time of driving an ejection unit 300, the ink can be allowed to flow in a common inlet path 211 and a common outlet path 212 by the first circulation pump (high pressure side) 1001 and the first circulation pump (low pressure side) 1002.

A negative pressure control unit 230 includes two pressure adjustment mechanisms in which different control pressures are set. A pressure adjustment mechanism (high pressure side) H and a pressure adjustment mechanism (low pressure side) L are connected to the common inlet path 211 and the common outlet path 212 in an ejection unit 300, respectively, through a supply unit 220 provided with a filter 221 removing foreign materials from the ink. In the ejection unit 300, the common inlet path 211, the common outlet path 212 and the inlet path 6 and the outlet path 7 which are in communication with the ejection element substrate 10 are provided. Since the inlet path 6 and the outlet path 7 are in communication with the common inlet path 211 and the common outlet path 212, a partial flow (an arrow in FIG. 6) of ink from the common inlet path 211 to the common outlet path 212 through an internal flow path of the ejection element substrate 10 is generated. The flow of the ink in the internal flow path in the ejection element substrate 10 is indicated by the arrow in FIG. 4. That is, as illustrated in FIG. 4, the ink in the first flow path 17 passes between the ejection orifice 1 and the ejection element to flow to the second flow path 18.

As illustrated in FIG. 6, since the pressure adjustment mechanism H is connected to the common inlet path 211 and at the same time, the pressure adjustment mechanism L is connected to the common outlet path 212, a difference in pressure between the inlet path 6 and the outlet path 7 is generated. Therefore, a difference in pressure between the inlet 8 (FIG. 4) which is in communication with the inlet path 6 and the outlet 9 (FIG. 4) which is in communication with the outlet path 7 is also generated. In the case of flowing the ink due to the difference in pressure between the inlet 8 and the outlet 9, it is preferable to control a flow rate (mm/s) of the ink to be 0.1 mm/s or more to 10.0 mm/s or less.

In the ink jet recording method according to the present invention, even during a recovery operation of the recording head, the ink in the first flow path may be flowed to the second flow path. When the ink flows during the recovery operation of the recording head, the ink constantly flows. When the ink constantly flows, evaporation of water easily occurs, such that a concentration of circulating ink is likely to be increased. In order to suppress the concentration of the ink from being increased, it is preferable that a mechanism for adding water to the ink with the passage of time is provided in the ink jet recording apparatus. Further, it is preferable that a detector detecting the concentration of the ink is disposed in the ink jet recording apparatus and water is added to the ink in sync with an increase in concentration of the ink to be detected.

Figure 7A:
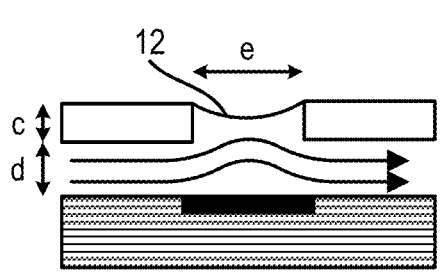
FIG. 7A is a schematic view for explaining a flow state of ink in the vicinity of an ejection orifice.
Figure 7B:
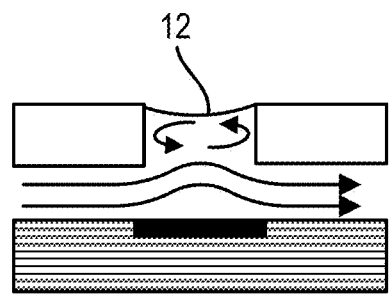
FIG. 7B is a schematic view for explaining the flow state of the ink in the vicinity of the ejection orifice.

FIGS. 7A and 7B are schematic views for explaining a flow state of ink in the vicinity of an ejection orifice. The flow state of the ink in the vicinity of the ejection orifice is roughly divided into two types. The first is a flow state in which a circulation flow is not formed in the vicinity of a meniscus 12 of the ejection orifice as illustrated in FIG. 7A. The second is a flow state in which a circulation flow is formed in the vicinity of the meniscus 12 of the ejection orifice as illustrated in FIG. 7B. Even though the ink in the flow path has the same flow rate, the flow state of the ink in the vicinity of the meniscus 12 may not be constant. It is thought that the flow state of the ink depends on a thickness c of the ejection orifice formation member, a height d of the flow path and a diameter e of the ejection orifice rather than the flow rate of the ink in the flow path. For example, in the case in which a height d of the flow path and a diameter e of the ejection orifice are the same as each other, when a thickness c of the ejection orifice formation member is large, the circulation flow is easily formed in the vicinity of the meniscus 12 as illustrated in FIG. 7B.

Figure 8:
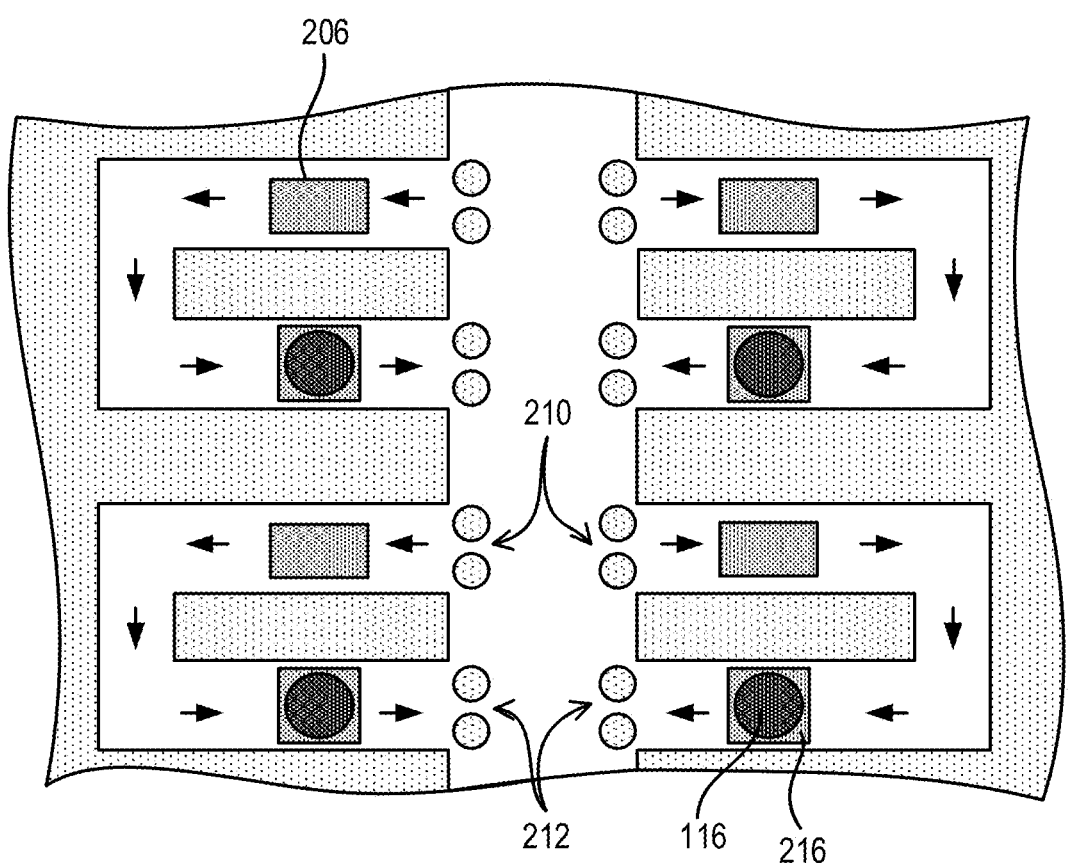
FIG. 8 is a cross-sectional view partially illustrating an example of the line head.

Next, a method of intermittently flowing ink will be described with reference to FIG. 8. FIG. 8 is a cross-sectional view partially illustrating an example of the line head. As illustrated in FIG. 8, the ink introduced from the inlet 210 flows in an arrow direction by an action of a circulation pump 206 corresponding to a flowing unit of the ink to thereby be discharged from the outlet 212. Further, the circulation pump 206 is a pump capable of intermittently flowing the ink. For this reason, the ink can intermittently flow between an ejection orifice 116 and an ejection element 216 by driving the circulation pump 206. In the case of intermittently flowing the ink, it is preferable to control a flow rate (m/s) of the ink to be 1.0 m/s or more to 10.0 m/s or less.

<Ink>

Ink used in the ink jet recording method and the ink jet recording apparatus according to the present invention is aqueous ink for ink jet having dynamic surface tension of 35 mN/m or more to 48 mN/m or less at 10 milliseconds. Hereinafter, respective components constituting the ink or physical properties of the ink will be described in detail.

(Coloring Material)

As a coloring material contained in the ink, a pigment or a dye can be used. A content (% by mass) of the coloring material in the ink is preferably 0.50% by mass or more to 15.00% by mass or less and more preferably, 1.00% by mass or more to 10.00% by mass or less, based on a total mass of the ink.

Specific examples of the pigment can include inorganic pigments such as carbon black and titanium oxide and organic pigments such as azo, phthalocyanine, quinacridone, isoindolinone, imidazolone, diketopyrrolopyrrole, dioxazine and the like.

As a dispersion method of the pigment, a resin-dispersed pigment using a resin as a dispersant, a self-dispersible pigment in which a hydrophilic group is bonded to a particle surface of the pigment or the like, can be used. Further, a resin-bonded pigment in which an organic group including a resin is chemically bonded to a particle surface of the pigment or a microcapsule pigment of which a particle surface is coated with a resin or the like, can be used.

As a resin dispersant for dispersing the pigment in an aqueous medium, it is preferable to use a resin dispersant capable of dispersing the pigment in the aqueous medium by an action of an anionic group. As the resin dispersant, resins to be described below, among them, a water-soluble resin can be used. A content (% by mass) of the pigment in the ink is preferably 0.3 times or more to 10.0 times or less as a mass ratio with respect to a content of the resin dispersant.

As the self-dispersible pigment, a self-dispersible pigment in which an anionic group such as a carboxylic acid group, a sulfonic acid group or a phosphonic acid group is bonded to the particle surface of the pigment directly or through another atomic (—R—) group can be used. The anionic group may be in an acid or salt form. In the case of a salt form, the anionic group may be in a state in which the anionic group is partially disassociated or in a state in which it is completely disassociated. When the anionic group is in the salt form, examples of cations corresponding to counterions can include alkaline metal cations, ammonium, organic ammonium and the like. Specific examples of another atomic (—R—) group can include a linear or branched alkylene group having 1 to 12 carbon atoms; arylene groups such as a phenylene group and a naphthylene group; a carbonyl group; an imino group; an amide group; a sulfonyl group; an ester group; an ether group and the like. Further, it is also possible to combine these groups.

As the dye, it is preferable to use a dye having an anionic group. Specific examples of the dye can include azo, triphenylmethane, (aza)phthalocyanine, xanthene, anthrapyridone dyes and the like.

(Resin)

A resin can be contained in the ink. A content (% by mass) of the resin in the ink is preferably 0.10% by mass or more to 20.00% by mass or less and more preferably, 0.50% by mass or more to 15.00% by mass or less, based on a total mass of the ink.

The resin can be added to the ink, (i) in order to stabilize a dispersion state of the pigment, that is, as the resin dispersant or a dispersing aid. Further, the resin can be added to the ink (ii) in order to improve various properties of an image to be recorded. As a form of the resin, there are a block copolymer, a random copolymer, a graft copolymer, a combination thereof and the like. Further, the resin may be a water-soluble resin capable of being dissolved in an aqueous medium. Alternatively, the resin may also be a resin particle dispersed in the aqueous medium. The resin particle does not have to contain the coloring material. In the case of using the resin as the dispersant for dispersing the pigment, it is preferable that in addition to the resin, a separate resin as the dispersant is further contained.

As used herein, "the resin is water-soluble" means that the resin is present in an aqueous medium in a state in which the resin does not form a particle of which a diameter can be measured by a dynamic light scattering method when the resin is neutralized with an alkali in a molar amount equivalent to an acid value. Whether or not the resin is water-soluble can be determined by a method described below. First, a liquid (resin solid content: 10% by mass) containing a resin neutralized with an alkali (sodium hydroxide, potassium hydroxide or the like) equivalent to an acid value is prepared. Next, the prepared liquid is diluted with pure water 10 times (based on volume), thereby preparing a test solution. Then, in the case of measuring a particle diameter of the resin in the test solution using the dynamic light scattering method, when a particle having a particle diameter are not measured, it can be judged that the resin is water-soluble. Here, for example, measurement conditions are as follows.

[Measurement Conditions]
SetZero: 30 seconds
Number of measurement: 3 times
Measurement time: 180 seconds As a particle size distribution measurement device, a particle size analyzer (for example, trade name "UPA-EX150" manufactured by Nikkiso Co., Ltd.) using the dynamic light scattering method or the like, can be used. However, the used particle size distribution measurement device or measurement conditions are not limited thereto.

It is preferable that the acid value of the water-soluble resin is 100 mgKOH/g or more to 250 mgKOH/g or less. It is preferable that an acid value of the resin constituting the resin particle is 5 mgKOH/g or more to 100 mgKOH/g or less. It is preferable that a weight average molecular weight of the water-soluble resin is 3,000 or more to 15,000 or less. It is preferable that a weight average molecular weight of the resin constituting the resin particle is 1,000 or more to 2,000,000 or less. It is preferable that a volume average particle diameter of the resin particle measured by the dynamic light scattering method is 100 nm or more to 500 nm or less.

Examples of the resin can include an acrylic resin, a urethane based resin, an olefin based resin and the like. Among them, the acrylic resin or the urethane based resin is preferable.

As the acrylic resin, an acrylic resin having a hydrophilic unit and a hydrophobic unit as constituent units is preferable. Among them, a resin having a hydrophilic unit derived from (meth)acrylic acid and a hydrophobic unit derived from at least one of a monomer having an aromatic ring and an (meth)acrylic acid ester based monomer is preferable. Particularly, a resin having a hydrophilic unit derived from (meth)acrylic acid and a hydrophobic unit derived from at least one monomer of styrene and α-methylstyrene is preferable. Since interactions between these resins and the pigment easily occur, these resins can be preferably used as the resin dispersant for dispersing the pigment.

The hydrophilic unit is a unit having a hydrophilic group such as an anionic group or the like. The hydrophilic unit can be formed by polymerizing, for example, a hydrophilic monomer having a hydrophilic group. Specific examples of the hydrophilic monomer having a hydrophilic group can include acidic monomers having a carboxylic acid group such as (meth)acrylic acid, itaconic acid, maleic acid, fumaric acid or the like, anionic monomers such as anhydrides or salts of these acid monomers and the like. Examples of cations constituting the salts of the acidic monomers can include lithium, sodium, potassium, ammonium and organic ammonium ions. The hydrophobic unit is a unit that does not have the hydrophilic group such as the anionic group or the like. The hydrophobic unit can be formed by polymerizing, for example, a hydrophobic monomer that does not have the hydrophilic group such as the anionic group or the like. Specific examples of the hydrophobic monomer can include monomers having an aromatic ring such as styrene, α-methylstyrene, benzyl (meth)acrylate; (meth)acrylic acid ester based monomers such as methyl (meth)acrylate, butyl (meth)acrylate, 2-ethylhexyl (meth)acrylate and the like.

The urethane based resin can be obtained by reacting, for example, polyisocyanate and a component (polyol or polyamine) reacting polyisocyanate with each other. Further, a cross-linking agent or a chain extender may be additionally reacted therewith.

Polyisocyanate is a compound having two or more isocyanate groups in a molecular structure thereof. As the polyisocyanate, aliphatic polyisocyanate, aromatic polyisocyanate or the like, can be used. Specific examples of the aliphatic polyisocyanate can include polyisocyanates having a chain structure such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate; polyisocyanates having a cyclic structure such as isophorone diisocyanate, hydrogenated xylene diisocyanate, 4,4'-dicyclohexylmethane diisocyanate, 1,4-cyclohexane diisocyanate, methylcyclohexylene diisocyanate, 1,3-bis(isocyanatomethyl)cyclohexane and the like.

Specific examples of the aromatic polyisocyanate can include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthalene diisocyanate, xylene diisocyanate, 1,3-phenylene diisocyanate, 1,4-phenylene diisocyanate, dialkyldiphenylmethane diisocyanate, tetraalkyldiphenylmethane diisocyanate, α,α,α',α'-tetramethylxylene diisocyanate and the like.

As the component reacted with the polyisocyanate to form the unit constituting the urethane resin, polyol can be used. As used herein, the term "polyol" means a compound having two or more hydroxy groups in a molecule. Specific examples thereof can include polyols that do not have an acidic group such as polyether polyol, polyester polyol and polycarbonate polyols; polyols having an acidic group and the like.

Examples of the polyols that do not have an acidic group can include long-chain polyols having a number average molecular weight of about 450 to 4,000 such as polyether polyol, polyester polyol and polycarbonate polyol.

Examples of the polyols having an acidic group can include polyols having an acidic group such as a carboxylic acid group, a sulfonic acid group and a phosphonic acid group in the structure. Particularly, it is preferable to use a water-soluble urethane resin synthesized additionally using a polyol having an acidic group such as dimethylol propionic acid or dimethylol butanoic acid in addition to the polyol that does not have an acidic group. The acidic group may be in a salt form. Examples of a cation constituting the salt can include lithium, sodium, potassium, ammonium and organic ammonium ions. In the case in which the water-soluble urethane resin has an acidic group, generally, the acidic group is neutralized by a neutralizing agent such as hydroxides of alkali metals (lithium, sodium, potassium and the like.) or ammonia water, thereby exhibiting water solubility.

Examples of polyamine can include monoamines having a plurality of hydroxy groups such as dimethylolethylamine, diethanolmethylamine, dipropanolethylamine and dibutanolmethylamine; bifunctional polyamines such as ethylenediamine, propylenediamine, hexylenediamine, isophoronediamine, xylylenediamine, diphenylmethanediamine, hydrogenated diphenylmethanediamine and hydrazine; tri- or higher functional polyamines such as diethylenetriamine, triethylenetetramine, tetraethylenepentamine, polyamidepolyamine and polyethylenepolyimine and the like. Further, for convenience, compounds having a plurality of hydroxy groups and one "amino group or imino group" were also mentioned as "polyamine".

At the time of synthesizing the urethane resin, a cross-linking agent or a chain extender can be used. Generally, the cross-linking agent is used to synthesize a prepolymer, and the chain extender is used to perform a chain extension reaction on a prepolymer synthesized in advance. Basically, the cross-linking agent or the chain extender is suitably selected from water, polyisocyanate, polyol and polyamine, depending on the purpose such as cross-linking, chain extension or the like, to thereby be used. As the chain extender, a chain extender capable of cross-linking the polyurethane resin can also be used.

Examples of the olefin based resin can include α-olefin polymers such as polyethylene and polypropylene. A main constituent unit of the α-olefin polymer is an α-olefin unit such as an ethylene unit and a propylene unit. The α-olefin polymer as described above may be an ethylene homopolymer or propylene homopolymer. Alternatively, the α-olefin polymer may also be a copolymer of α-olefin such as ethylene, propylene, 1-butene, 1-pentene, 1-hexene and 4-methyl-1-pentene. Examples of the copolymer can include a random copolymer, a block copolymer, a graft copolymer and a combination of these copolymers.

[Resin Particle]

It is preferable that the ink contains the resin particle. The meniscus can be further stabilized by using the ink containing the resin particle. Since entanglement of molecules such as water-soluble resins is small, the resin particle is likely to quickly migrate to the vicinity of the meniscus together with a flow of the ink. That is, it is thought that the meniscus is stabilized by interparticle interactions between the resin particles oriented in the vicinity of the meniscus, and occurrence of fine unevenness is more effectively decreased by further suppressing a decrease in ejection volume of the ink in the nozzle having a high ejection frequency. Examples of the resin particle can include an acrylic resin particle, an olefin based resin particle and a urethane based resin particle.

[Water-Soluble Urethane Resin]

It is preferable that the ink contains a water-soluble urethane resin. Among the water-soluble resin, the water-soluble urethane resins form a stable molecular film while rapidly interacting with each other in the vicinity of the meniscus. For this reason, occurrence of fine unevenness is more effectively decreased by using the ink containing the water-soluble urethane resin to further suppress a decrease in ejection volume of the ink in the nozzle having a high ejection frequency.

[Block Copolymer]

It is preferable that the ink contains a block copolymer. Generally, the block copolymer has a structure in which a plurality of blocks derived from monomers having the same or similar properties are arranged. A block copolymer generally used in aqueous ink for ink jet has a structure to be described below. For example, there are an AB block structure having a hydrophobic block (A block) and an ionic hydrophilic block (B block); an ABC block structure in which a non-ionic hydrophilic block (C block) is further added to the AB block structure and the like. That is, since the block copolymer has a structure in which the hydrophilic blocks and the hydrophobic blocks are localized, respectively, the block copolymer has high surface activity and is rapidly oriented in the vicinity of the meniscus. For this reason, in the case of using the ink containing the block copolymer, the meniscus is stabilized, and a decrease in ejection volume of the ink in the nozzle having a high ejection frequency is further suppressed, such that occurrence of fine unevenness is more effectively decreased.

The block copolymer can be synthesized by a general synthesis method such as an anion-living polymerization method, a cation living polymerization method, a group transfer polymerization method, an atom transfer radical polymerization method, a reversible addition fragmentation chain transfer polymerization and the like. It is preferable that the block copolymer is a water-soluble resin rather than a resin particle.

(Polyhydric Alcohol Derivative)

It is preferable that the ink contains a polyhydric alcohol derivative in which X mole(s) of ethylene oxide group(s) and Y mole(s) of propylene oxide group are added to a polyhydric alcohol having three or more hydroxy groups. This polyhydric alcohol derivative is a compound satisfying that a proportion of $\{Y/(X+Y)\} \times 100(\%)$ is 70% or more to 90% or less.

The polyhydric alcohol derivative is an alkylene oxide modified polyhydric alcohol compound having a structure in which an ethylene oxide group and a propylene oxide group are added to a portion of a hydroxy group of a polyhydric alcohol having three or more hydroxy groups except for a hydrogen atom. The polyhydric alcohol derivative has a structure represented by the following General Formula (2).

 (2)

In General Formula (2), L is an alcohol residue except for hydroxy groups. In General Formula (2), R represents an ethylene oxide group or a propylene oxide group independently of each other, n is an integer of three or more and represents the number of alkylene oxide groups. The value of the sum of n in one molecule of the polyhydric alcohol derivative is equal to the value of X+Y, and m is an integer of three or more and equal to the number of hydroxy groups of polyhydric alcohol. In General Formula (2), the ethylene oxide group and the propylene oxide group represented by R may be a block structure or a random structure. The mole numbers and the proportions of the ethylene oxide group and the propylene oxide group represented by R are calculated on the assumption that the mole numbers and the proportions are added in average to a plurality of Rs as average values of the mole numbers of the ethylene oxide group(s) and the propylene oxide group(s) added to the whole of one molecule of the polyhydric alcohol derivative.

An ethylene oxide group is expressed as —$CH_2CH_2O$—. The propylene oxide group is expressed as —$CH_2CH(CH_3)O$—. The proportion of {Y/(X+Y)}×100(%) expressed by using the mole number X of the ethylene oxide group(s) and the mole number Y of the propylene oxide group(s) in one molecule of the polyhydric alcohol derivative is 70% or more to 90% or less.

The polyhydric alcohol derivative as described above has a repeating unit of the ethylene oxide group and a repeating unit of the propylene oxide group in a molecular structure. The repeating unit of the ethylene oxide group is hydrogen-bonded to water molecules in the ink and the repeating unit of the propylene oxide group is likely to be oriented toward a gas-liquid interface due to relatively high hydrophobicity thereof. Therefore, the polyhydric alcohol derivative is contained in the ink, such that the meniscus can be stabilized in such a state as if a molecular film is formed on the meniscus. The number of the hydroxy groups of the polyhydric alcohol is 3 or more, the meniscus is further stabilized. When the proportion of {Y/(X+Y)}×100(%) is less than 70%, due to excessively high hydrophilicity, the ink is likely to move toward a liquid chamber in addition to water evaporation from the meniscus, such that molecules present in the vicinity of the meniscus may be decreased. Meanwhile, when the proportion of {Y/(X+Y)}×100(%) is more than 90%, due to excessively high hydrophobicity, an amount of the polyhydric alcohol derivative molecules present in the vicinity of the meniscus is increased. For this reason, an amount of water molecules incorporated into a hydrogen bond network is decreased, such that a viscosity of the ink in the vicinity of the meniscus may be increased. Therefore, it is difficult to exhibit an action to be expected at the time of adding the polyhydric alcohol derivative, such that an effect of effectively decreasing occurrence of fine unevenness may not be sufficiently obtained.

The number of the hydroxy groups of the polyhydric alcohol which is a main skeleton of the polyhydric alcohol derivative is 3 or more. The number of the hydroxy groups of the polyhydric alcohol is preferably 10 or less and more preferably 3 or more to 6 or less. Examples of the polyhydric alcohol can include sorbitol, maltitol, xylitol, erythritol, lactitol, mannitol, glycerin, polyglycerin, oligosaccharide alcohol, palatinit, threitol, arabinitol, ribitol, iditol, volemitol, perseitol, octitol, galactitol, trimethylolpropane, trimethylolethane and condensates thereof. Among them, particularly, sorbitol is preferable.

It is preferable that a content (% by mass) of the polyhydric alcohol derivative in the ink is 0.50% by mass or more to 4.00% by mass or less based on the total mass of the ink. When the content of the polyhydric alcohol derivative is less than 0.50% by mass, since an action of stabilizing the meniscus by the polyhydric alcohol derivative is slightly decreased, the effect of more effectively decreasing occurrence of fine unevenness may not be sufficiently obtained. Meanwhile, when the content of the polyhydric alcohol derivative is more than 4.00% by mass, since the viscosity of the ink is increased, intermittent ejection stability may be slightly deteriorated.

A molecular weight of the polyhydric alcohol derivative is preferably 1,500 or more to 25,000 or less, more preferably 2,000 or more to 15,000 or less and further more preferably, 3,000 or more to 10,000 or less. Further, in some cases, in the polyhydric alcohol derivative, the number of moles of the ethylene oxide group or the propylene oxide group has a distribution. In this case, the molecular weight can be computationally calculated using an average value of the numbers of moles.

(Surfactant)

It is preferable that the ink contains a surfactant. Since the surfactant is oriented to a gas-liquid interface by allowing a hydrophilic group to face toward an ink side while allowing a hydrophobic group to face toward an air side, the meniscus can be further stabilized. Examples of the surfactant can include anionic surfactants, non-ionic surfactants, cationic surfactants, amphoteric surfactants and the like. Among them, the non-ionic surfactant is preferably used in view of reliability of the ink.

Examples of the non-ionic surfactant can include hydrocarbon based surfactants such as ethylene oxide adducts of acetylene glycol and polyoxyethylenealkyl ether; fluorine based surfactants such as perfluoroalkylethylene oxide adducts; silicon based surfactants such as polyether modified siloxane compounds and the like. Among them, the hydrocarbon based surfactants are preferable, and the ethylene oxide adducts of acetylene glycol are more preferable.

It is particularly preferable to use a compound represented by the following General Formula (1) among the ethylene oxide adducts of acetylene glycol.

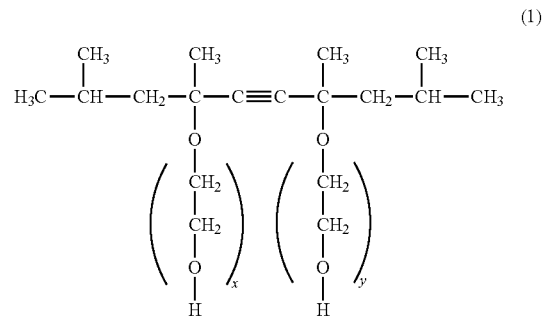 (1)

(In General Formula (1), x and y are each the number of added ethylene oxide groups.)

The compound represented by General Formula (1) has a high orientation speed to an interface and can be rapidly oriented to the meniscus. For this reason, the meniscus can be stabilized even in a situation in which the meniscus is likely to be retracted such as a situation in which a flow speed of the ink is rapid or vibration of the meniscus by ejection is large. In General Formula (1), it is preferable that x+y is 1.3 or more to 10.0 or less. A content (% by mass) of the compound represented by General Formula (1) in the ink is preferably 0.05% by mass or more to 5.00% by mass or less and more preferably, 0.10% by mass or more to 3.00% by mass or less, based on the total mass of the ink.

(Aqueous Medium)

The ink used in the ink jet recording method according to the present invention is aqueous ink containing at least water as an aqueous medium. Water or an aqueous medium corresponding to a mixed solvent of water and a water-soluble organic solvent can be contained in the ink. It is preferable to use deionized water or ion-exchange water as the water. A content (% by mass) of the water in the aqueous ink is preferably 50.00% by mass or more to 95.00% by mass or less, based on the total mass of the ink. Further, a content (% by mass) of the water-soluble organic solvent in the aqueous ink is preferably 3.00% by mass or more to 50.00% by mass or less, based on the total mass of the ink. As the water-soluble organic solvent, any water-soluble organic solvent can be used as long as it can be used in the ink for ink jet. For example, alcohols, (poly)alkylene glycols, glycol ethers, nitrogen-containing compounds, sulfur-containing compounds can be used.

(Other Additives)

If necessary, various additives such as a defoaming agent, other surfactants, a pH adjusting agent, a viscosity modifier, a rust preventing agent, an antiseptic, an antifungal agent, an antioxidant and a reduction inhibitor in addition to the above-mentioned components may be contained in the ink.

(Dynamic Surface Tension)

The ink used in the ink jet recording method according the present invention is aqueous ink having dynamic surface tension of 35 mN/m or more to 48 mN/m or less at 10 milliseconds. The dynamic surface tension of the ink is measured by a maximum bubble pressure method. The maximum bubble pressure method is a method of measuring a maximum pressure required to release bubbles generated at a tip of a probe (capillary tube) immersed in a liquid to be measured and obtaining surface tension of the liquid from the measured maximum pressure. In detail, the maximum pressure is measured while bubbles are continuously generated at the tip of the probe. A time until a bubble pressure reaches the maximum bubble pressure (a point in time at which a radius of curvature of the bubble becomes equal to a radius of the tip of the probe) from a point in time at which a new bubble surface is generated at the tip of the probe is referred to as a "lifetime". That is, the maximum bubble pressure method is a method of measuring surface tension of a liquid in a state in which there is a movement. The dynamic surface tension of the ink at 10 milliseconds can be easily adjusted by the kind and a content of water-soluble organic solvent or surfactant.

(Viscosity)

The viscosity of the ink is preferably 3.0 mPa·s or more and more preferably 5.0 mPa·s or less. The viscosity of the ink is set to 3.0 mPa·s or more, such that a stable meniscus can be formed, and a decrease in ejection volume of the ink in the nozzle having a high ejection frequency can be further suppressed. The viscosity of the ink can be measured using a rotational viscometer.

According to the present invention, the ink jet recording method capable of recording a high-quality image in which occurrence of fine unevenness is decreased can be provided. Further, according to the present invention, the ink jet recording apparatus used in the ink jet recording method can be provided.

EXAMPLE

Hereinafter, the present invention will be described in more detail through Examples and Comparative Examples, but the present invention is not limited to the following Examples as long as the present invention does not depart from the gist thereof. Unless otherwise specified, the terms "part(s)" and "%" indicating component amounts are based on mass.

<Preparation of Pigment Dispersion Liquid>

A styrene-ethyl acrylate-acrylic acid copolymer (resin 1) having an acid value of 150 mg KOH/g and a weight average molecular weight of 8,000 was prepared. An aqueous solution of the resin 1 in which a content (solid content) of the resin is 20.0% was prepared by adding a suitable amount of pure water thereto while neutralizing 20.0 parts of the resin 1 with potassium hydroxide (moles equivalent to the acid value). A mixture was obtained by mixing 10.0 parts of a pigment (carbon black), 15.0 parts of the aqueous solution of the resin 1 and 75.0 parts of pure water. After putting the obtained mixture and 200 parts of zirconia beads having a diameter of 0.3 mm into a batch type vertical sand mill (manufactured by Aimex Co., Ltd.), dispersion was performed for 5 hours while cooling with water, followed by centrifugation, thereby removing coarse particles. The resultant was subjected to pressure-filtration using a cellulose acetate filter (manufactured by Advantec) having a pore size of 3.0 μm, thereby preparing a pigment dispersion liquid 1 in which a content of the pigment was 10.0% and a content of a resin dispersant (resin 1) was 3.0%.

Further, the kinds of pigment were changed to C.I pigment blue 15:3, C.I. pigment red 122 and C.I. pigment yellow 74, respectively. Pigments dispersions 2 to 4 in which a content of the pigment was 10.0% and a content of a resin dispersant (resin 1) was 3.0% were prepared by a procedure similar to that in the above-mentioned pigment dispersion liquid 1 except for the above-mentioned difference.

<Analysis Conditions of Resin>

An acid value of a resin was measured and calculated by performing potentiometric titration with a potassium hydroxide/ethanol titration solution using an automatic potentiometric titrator. The weight average molecular weight of the resin (in terms of polystyrene) was measured by gel permeation chromatography. Further, whether or not the resin was water-soluble was confirmed by a method described below. First, a test sample in which a content (solid content) of a resin was 1.0% was prepared by diluting a liquid containing the resin (a resin particle, a urethane resin or a block copolymer) with pure water. Next, in the case of measuring a particle diameter of the resin particle in the prepared test sample using a dynamic light scattering method, when a particle having a particle diameter were not measured, the resin was determined to be water-soluble. Here, measurement conditions are as described below. As a particle size distribution measuring device, a particle size analyzer (trade name: "UPA-EX150" manufactured by Nikkiso Co., Ltd.) using the dynamic light scattering method was used.

[Measurement Conditions]

SetZero: 30 seconds
Number of Measurement: 3 times
Measurement time: 180 seconds Particle diameters of synthesized resin particle 1 to 4 to be described below could be measured by the above-mentioned method. Meanwhile, it was confirmed that it was impossible to measure particle diameters of other resins except for the resin particle 1 to 4, and these resins were water-soluble resins.

<Synthesis of Resin Particle>

(Resin Particle 1)

A 4-necked flask equipped with a stirrer, a reflux condenser and a nitrogen gas introducing tube was charged with 18.0 parts of n-butyl methacrylate, 0.35 parts of methacrylic acid, 2.0 parts of a polymerization initiator (2,2'-azobis(2-methylbutyronitrile) and 2.0 parts of n-hexadecane. Nitrogen gas was introduced into a reaction system, and stirring was performed for 0.5 hours. A mixture was obtained by dropping 78.0 parts of a 6.0% aqueous solution of an emulsifier (trade name: "NIKKOL BC15", manufactured by Nikko Chemicals Co., Ltd.) into the reaction system and performing the stirring for 0.5 hours. The mixture was emulsified by applying ultrasonic waves for 3 hours with an ultrasonic wave irradiator, and then a polymerization reaction was carried out at 80° C. for 4 hours under a nitrogen atmosphere. After the reaction system was cooled to 25° C. and filtered, and a suitable amount of pure water was added thereto, thereby preparing a water dispersion of a resin particle 1 in which a content (solid content) of the resin particle was 25.0%.

(Resin Particle 2)

A water dispersion of a resin particle 2 in which a content (solid content) of the resin particle was 25.0% was prepared by a procedure similar to that in the above-mentioned resin particle 1 except for changing n-butyl methacrylate to ethyl methacrylate.

(Synthesis of Resin Particle 3)

A resin particle 3 was synthesized by the following procedure. A flask was charged with 22.0 parts of neopentyl glycol, 15.0 parts of 1,4-butanediol, 9.0 parts of 1,2-butanediol, 54.0 parts of adipic acid and 0.003 parts of tetraisopropyl titanate as an esterification catalyst, and these materials were melted at 120° C. A temperature was raised to 220° C. over 3 to 4 hours while stirring, and the temperature was maintained at 220° C. for 10 hours and then cooled to 100° C., thereby preparing polyester polyol having a number average molecular weight of 1,000. The prepared polyester polyol was cooled to 25° C. to thereby be used in synthesizing a urethane resin particle.

A 4-necked flask equipped with a thermometer, a stirrer, a nitrogen gas introducing tube and a cooling tube was charged with 60.0 parts of the polyester polyol obtained above, 36.0 parts of isophorone diisocyanate, 4.0 parts of dimethylol propionic acid and 60.1 parts of methyl ethyl ketone. A reaction was carried out for 5 hours under a nitrogen gas atmosphere. Next, an aqueous solution of potassium hydroxide required to neutralize the resin was added thereto and stirred, and then, a suitable amount of pure water was added thereto and sufficiently stirred. Thereafter, methyl ethyl ketone was removed by distillation under heating and reduced pressure, thereby preparing a water dispersion of a resin particle 3 in which a content (solid content) of the resin particle was 25.0%.

(Synthesis of Resin Particle 4)

An α-olefin polymer in which a mass ratio of ethylene and propylene was 50.0:50.0 was synthesized by gas phase polymerization using a fluidized bed reactor described in "Example 1" disclosed in Japanese Patent Application Laid-Open No. H11-100406 under a condition at which a pressure (total pressure) at the time of polymerization was set to 30 kg/cm$^2$G. A weight average molecular weight of the α-olefin polymer measured by GPC was 6,500.

A 500 mL separable flask equipped with a stirrer, a thermometer, a reflux condenser and a nitrogen gas introducing tube was charged with 100.0 parts of the obtained α-olefin polymer and 100.0 parts of diethyleneglycol monoethylether acetate. These material were melted in an oil bath of which a temperature was kept at 180° C. under a nitrogen atmosphere, and the temperature of the oil bath was adjusted while stirring so that a temperature of a system became 170° C. While stirring, 3.0 parts of 2-ethylhexyl acrylate, 7.0 parts of benzyl methacrylate, 5.0 parts of maleic anhydride and 0.4 parts of di-t-butylperoxide (trade name "Perbutyl D", manufactured by Nippon Oil & Fats Co., Ltd.) were added thereto. The temperature of the system was maintained at 170° C. and a reaction was carried out for 30 minutes. Then, 3.0 parts of 2-ethylhexyl acrylate, 7.0 parts of benzyl methacrylate, 5.0 parts of maleic anhydride and 0.4 parts of di-t-butyl peroxide were added thereto. Similarly, acrylic acid, benzyl methacrylate and di-t-butyl peroxide were added thereto 5 times in total every 30 minutes.

The reaction was stopped when a weight average molecular weight of a reaction product reached 8,000 by monitoring the reaction product by GPC in a state in which the temperature in the system was maintained at 170° C. The temperature in the system was lowered to 50° C. and a pressure in the flask was reduced by an aspirator for 1 hour to remove the solvent, unreacted monomer, di-t-butylperoxide and decomposition products of di-t-butylperoxide. After pressure reduction was terminated, the reaction product was taken out and cooled, thereby obtaining an acid-modified polyolefin (solid material) modified with maleic anhydride. A weight average molecular weight of the acid-modified polyolefin measured by GPC was 16,000.

A 1000 mL separable flask equipped with a stirrer, a thermometer and a reflux condenser was charged with 100.0 g of the acid-modified polyolefin, and the acid-modified polyolefin was melted in an oil bath of which a temperature was kept at 130° C. In a state in which the temperature of the oil bath was maintained at 130° C., an 8 mol/L aqueous solution of potassium hydroxide was added thereto so as to have a molar ratio corresponding to 0.8 times the acid value. Then, 300 g of ion exchange water of 80° C. was added thereto little by little while strongly stirring. A viscosity in the system was increased, but as the ion exchange water was continuously added thereto, the viscosity was decreased. After an internal temperature became 30° C. by cooling, contents were filtered using a 100-mesh nylon filter cloth, and a suitable amount of pure water was added thereto, thereby preparing a water dispersion of a resin particle 4 in which a content (solid content) of the resin particle was 25.0%.

<Synthesis of Urethane Resin>

(Urethane Resin 1)

A 4-necked flask equipped with a thermometer, a stirrer, a nitrogen gas introducing tube and a cooling tube was charged with 39.3 g of polytetramethylene glycol having a number average molecular weight of 2,000, 44.5 g of isophorone diisocyanate and 0.007 g of dibutyltin dilaurate. A reaction was carried out at a temperature of 100° C. for 5 hours under a nitrogen gas atmosphere, and then the temperature was cooled to 65° C. or less. After adding 13.2 g of dimethylol propionate, 3.0 g of neopentyl glycol and 150.0 g of methyl ethyl ketone thereto, a reaction was carried out at a temperature of 80° C. Thereafter, the temperature was cooled to 40° C., and 20.0 g of methanol was added thereto to stop the reaction. Next, a suitable amount of ion exchange water was added thereto, and an aqueous solution of potassium hydroxide required to neutralize a resin was added thereto while stirring with a homomixer. Then, methyl ethyl ketone and unreacted methanol were removed by distillation under heating and reduced pressure, thereby preparing an aqueous solution of a urethane resin 1 in which the urethane resin 1 having an acid value of 55 mgKOH/g and a weight average molecular weight of 15,000 was contained and a content (solid content) of the resin was 20.0%.

(Urethane Resin 2)

The polytetramethylene glycol having a number average molecular weight of 2,000 was changed to polypropylene glycol having a number average molecular weight of 2,000. An aqueous solution of a urethane resin 2 in which the urethane resin 2 having an acid value of 55 mgKOH/g and a weight average molecular weight of 15,000 was contained and a content (solid content) of the resin was 20.0% was prepared by a procedure similar to that in the above-mentioned urethane resin 1 except for the above-mentioned difference.

<Synthesis of Block Copolymer>

After a 4-necked flask equipped with a stirrer, a thermometer, a nitrogen gas introducing tube and a reflux tube was purged with nitrogen, 100.0 parts of dimethylformamide and 0.5 parts of pentamethyldiethylenetriamine were added thereto. A monomer A (the kind and an amount of monomer A were illustrated in Table 1) and 0.07 parts a polymerization initiator (chloroethylbenzene) were put and heated to a temperature of 80° C. while stirring. Next, copper (I) chloride was added thereto, and a block A composed of a unit derived from the monomer A was polymerized. After a molecular weight was monitored by gel permeation chromatography (GPC) and polymerization of the monomer A was completed, the polymerization was continued by adding a monomer B (the kind and an amount of the monomer B were illustrated in Table 1).

After a molecular weight was monitored by GPC and polymerization of the monomer B was completed, the polymerization was continued by adding a monomer C (the kind and an amount of the monomer C were illustrated in Table 1). Further, a monomer D was also added in the same manner to continue the polymerization. After stopping the polymerization, a carboxylic acid ester group was hydrolyzed using a methanol solution of sodium hydroxide to obtain a carboxylic acid group. After 2.8 parts of a 35.0% aqueous solution of hydrochloric acid were added, the mixture was stirred at 25° C. for 10 minutes and filtered. The resultant was washed with pure water three times and dried, thereby obtaining block copolymers 1 and 2.

$^1$H-NMR was measured, and it was confirmed that TMS ester was hydrolyzed by the presence of a chemical shift (peak) of the carboxylic acid group. Further, a composition ratio of the monomer constituting each of the blocks was calculated by measuring $^1$H-NMR. Various properties of the block copolymer are illustrated in Table 1. Further, details of each of the components in Table 1 are as described below.

BzMA: benzyl methacrylate
BMA: n-butyl methacrylate
TMS-MAA: trimethylsilyl methacrylate
MAA: methacrylic acid
MMA: methyl methacrylate The obtained block copolymer was dissolved in tetrahydrofuran, and then potassium hydroxide was added thereto in a molar amount equivalent to an acid value of the block copolymer. After adding a suitable amount of pure water thereto and stirring, tetrahydrofuran was removed under reduced pressure conditions. A suitable amount of pure water was added thereto, thereby preparing aqueous solutions of the block copolymers 1 and 2 in which a content (solid content) of the resin was 20.0%.

TABLE 1

Synthesis conditions and properties of block copolymers

| | | | Block Copolymer | |
| --- | --- | --- | --- | --- |
| | | | 1 | 2 |
| Synthesis Conditions | Copper (I) Chloride (parts) | | 0.10 | 0.10 |
| | Monomer A | Kind | BzMA | BzMA |
| | | Amount (parts) | 3.52 | 3.52 |
| | Monomer B | Kind | BMA | BMA |
| | | amount (parts) | 6.31 | 3.51 |
| | Monomer C | Kind | TMS-MAA | MMA |
| | | Amount (parts) | 5.54 | 2.00 |
| | Monomer D | Kind | | TMS-MAA |
| | | Amount (parts) | | 5.06 |
| Properties | Block A | Kind | BzMA | BzMA |
| | | Ratio (%) | 27.4 | 29.9 |
| | Block B | Kind | BMA | BMA |
| | | Ratio (%) | 49.1 | 29.7 |
| | Block C | Kind | MAA | MMA |
| | | Ratio (%) | 23.5 | 17.0 |

TABLE 1-continued

Synthesis conditions and properties of block copolymers

| | | Block Copolymer | |
| --- | --- | --- | --- |
| | | 1 | 2 |
| Block D | Kind | | MAA |
| | Ratio (%) | | 23.4 |
| Weight average molecular weight | | 11,000 | 10,000 |
| Acid value (mgKOH/g) | | 150 | 150 |

<Synthesis of Random Copolymer>

Random copolymers 1 and 2 were synthesized by copolymerizing monomers (unit: part) described in an upper portion of Table 2 using a general method. Potassium hydroxide was added thereto in a molar amount equivalent to the acid value of the random copolymer. Further, a suitable amount of pure water was added thereto, thereby preparing aqueous solutions of the random copolymers 1 and 2 in which a content (solid content) of the resin was 20.0%. Various properties of the random copolymers are illustrated in Table 2. Further, details of each of the components in Table 2 are as described below.

St: styrene
BA: n-butyl acrylate
BzMA: benzyl methacrylate
AAA: acrylic acid
MAA: methacrylic acid

TABLE 2

Synthesis conditions and properties of random copolymers

| | | Random Copolymer | |
| --- | --- | --- | --- |
| | | 1 | 2 |
| Synthesis Conditions | St | 60.0 | |
| | BA | 21.0 | 27.0 |
| | BzMA | | 50.0 |
| | AA | 19.0 | |
| | MAA | | 23.0 |
| Properties | Weight Average Molecular Weight | 10,000 | 10,000 |
| | Acid Value (mgKOH/g) | 148 | 150 |

<Preparation of Polyhydric Alcohol Derivative>

Polyhydric alcohol derivatives (Compounds 1 to 3) illustrated in Table 3, "m" and "n" are values of "m" and "n" in the following Formula (A).

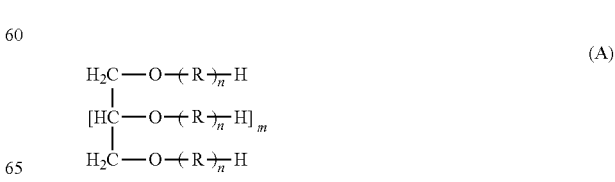

(A)

TABLE 3

Properties of polyhydric alcohol derivative

| | Polyhydric alcohol | | | Alkylene oxide group | | | |
|---|---|---|---|---|---|---|---|
| Compound | Kind | Valence m | Sum of n (X + Y) | Ethylene Oxide Group X (mole) | Propylene Oxide Group Y (mole) | Value (%) of {Y/(X + Y)}*100 | Molecular Weight |
| 1 | Sorbitol | 6  4 | 100 | 30 | 70 | 70 | 5,569 |
| 2 | Sorbitol | 6  4 | 100 | 20 | 80 | 80 | 5,709 |
| 3 | Sorbitol | 6  4 | 100 | 10 | 90 | 90 | 5,850 |

<Preparation of Ink>

Respective components (unit: %) illustrated in an upper portion of Table 4 were mixed and sufficiently stirred and then subjected to pressure-filtration using a cellulose acetate filter (manufactured by Advantec) having a pore size of 3.0 μm, thereby preparing respective inks. "Zonyl FS-3100" is a trade name of a fluorine based non-ionic surfactant manufactured by DuPont. "Acetylenol E13", "Acetylenol E60" and "Acetylenol E100" are all trade names of surfactants manufactured by Kawaken Fine Chemicals Co., Ltd., represented by General Formula (1). Values of "x+y" in General Formula (1) for "Acetylenol E13", "Acetylenol E60" and "Acetylenol E100" were "1.3", "6.0" and "10.0", respectively.

Dynamic surface tension $\gamma 10$ (mN/m) of the ink at 10 milliseconds and viscosity $\eta$ (mPa·s) thereof are illustrated in a lower portion of Table 4. The dynamic surface tension $\gamma 10$ of the ink was measured under the condition at 25° C. using a dynamic surface tension meter (trade name: "BUBBLE PRESSURE TENSIOMETER BP-2", manufactured by KRUSS) by a maximum bubble pressure method. The viscosity $\eta$ of the ink was measured under the condition at 25° C. using an E-type viscometer (trade name: "RE-85L", manufactured by Toki Sangyo Co., Ltd.).

TABLE 4

Composition and properties of ink

| | Ink | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment Dispersion Liquid 1 | 40.00 | 40.00 | 40.00 | | | | 40.00 | 40.00 | 40.00 | 40.00 | 40.00 |
| Pigment Dispersion Liquid 2 | | | | 40.00 | | | | | | | |
| Pigment Dispersion Liquid 3 | | | | | 40.00 | | | | | | |
| Pigment Dispersion Liquid 4 | | | | | | 40.00 | | | | | |
| Glycerin | 15.00 | 15.00 | 15.00 | 15.00 | 15.00 | 15.00 | 6.00 | 7.00 | 15.00 | 15.00 | 15.00 |
| Triethylene Glycol | 5.00 | 5.00 | 5.00 | 5.00 | 5.00 | 5.00 | 5.00 | 5.00 | 5.00 | 5.00 | 5.00 |
| 1,2-Hexanediol | 2.00 | 4.50 | 0.50 | 2.00 | 2.00 | 2.00 | 2.00 | 2.00 | 2.00 | 2.00 | 2.00 |
| 2-pyrrolidone | | | | | | | | | | | |
| Trimethylolpropane | | | | | | | | | | | |
| Water Dispersion of Resin Particle 1 | 12.00 | 12.00 | 12.00 | 12.00 | 12.00 | 12.00 | 12.00 | 12.00 | | | |
| Water Dispersion of Resin Particle 2 | | | | | | | | | 12.00 | | |
| Water Dispersion of Resin Particle 3 | | | | | | | | | | 12.00 | |
| Water Dispersion of Resin Particle 4 | | | | | | | | | | | 12.00 |
| Aqueous Solution of Urethane Resin 1 | | | | | | | | | | | |
| Aqueous Solution of Urethane Resin 2 | | | | | | | | | | | |
| Aqueous Solution of Block Copolymer 1 | | | | | | | | | | | |
| Aqueous Solution of Block Copolymer 2 | | | | | | | | | | | |
| Aqueous Solution of Random Copolymer 1 | | | | | | | | | | | |
| Aqueous Solution of Random Copolymer 2 | | | | | | | | | | | |
| Compound 1 | | | | | | | | | | | |
| Compound 2 | | | | | | | | | | | |
| Compound 3 | | | | | | | | | | | |
| Zonyl FS-3100 | 0.03 | 0.03 | 0.03 | 0.03 | 0.03 | 0.03 | 0.03 | 0.03 | 0.03 | 0.03 | 0.03 |
| Acetylenol E13 | | | | | | | | | | | |
| Acetylenol E60 | | | | | | | | | | | |
| Acetylenol E100 | | | | | | | | | | | |
| Oleic Acid | | | | | | | | | | | |
| Ion Exchange Water | 25.97 | 23.47 | 27.47 | 25.97 | 25.97 | 25.97 | 34.97 | 33.97 | 37.97 | 25.97 | 25.97 |
| Dynamic Surface Tension $\gamma 10$ (mN/m) | 40 | 35 | 48 | 39 | 39 | 39 | 40 | 40 | 40 | 40 | 40 |
| Viscosity $\eta$ (mPa · s) | 3.6 | 3.9 | 3.3 | 3.6 | 3.6 | 3.6 | 2.9 | 3.0 | 3.4 | 3.6 | 3.7 |

| | Ink | | | | | | | | | | |
|---|---|---|---|---|---|---|---|---|---|---|---|
| | 12 | 13 | 14 | 15 | 16 | 17 | 18 | 19 | 20 | 21 | 22 |
| Pigment Dispersion Liquid 1 | 40.00 | 40.00 | 40.00 | 40.00 | 40.00 | 40.00 | 40.00 | 40.00 | 40.00 | 40.00 | 40.00 |
| Pigment Dispersion Liquid 2 | | | | | | | | | | | |
| Pigment Dispersion Liquid 3 | | | | | | | | | | | |
| Pigment Dispersion Liquid 4 | | | | | | | | | | | |
| Glycerin | 15.00 | 15.00 | 15.00 | 15.00 | 15.00 | 15.00 | 15.00 | 15.00 | 15.00 | 12.00 | 15.00 |

TABLE 4-continued

| Composition and properties of ink | | | | | | | | | | | |
|---|---|---|---|---|---|---|---|---|---|---|---|
| Triethylene Glycol | 5.00 | 5.00 | 5.00 | 5.00 | 5.00 | 5.00 | 5.00 | 5.00 | 5.00 | 5.00 | 5.00 |
| 1,2-Hexanediol | 2.00 | 2.00 | 2.00 | 2.00 | 2.00 | 2.00 | 2.00 | 2.00 | 2.00 | 0.50 | 2.00 |
| 2-Pyrrolidone | | | | | | | | | | | |
| Trimethylolpropane | | | | | | | | | | | |
| Water Dispersion of Resin Particle 1 | | | 12.00 | | | 12.00 | | | | | 12.00 |
| Water Dispersion of Resin Particle 2 | | | | | | | | | | | |
| Water Dispersion of Resin Particle 3 | | | | | | | | | | | |
| Water Dispersion of Resin Particle 4 | 12.00 | | | | | | | | | | |
| Aqueous Solution of Urethane Resin 1 | | 5.00 | | | | | | | | | |
| Aqueous Solution of Urethane Resin 2 | | | 5.00 | 5.00 | | | | | | | |
| Aqueous Solution of Block Copolymer 1 | | | | | 5.00 | | | | | | |
| Aqueous Solution of Block Copolymer 2 | | | | | | 5.00 | 5.00 | | | | |
| Aqueous Solution of Random Copolymer 1 | | | | | | | | 5.00 | | | |
| Aqueous Solution of Random Copolymer 2 | | | | | | | | | 5.00 | | |
| Compound 1 | | | | | | | | | | | |
| Compound 2 | | | | | | | | | | | |
| Compound 3 | | | | | | | | | | | |
| Zonyl FS-3100 | 0.03 | 0.03 | 0.03 | 0.03 | 0.03 | 0.03 | 0.03 | 0.03 | 0.03 | | |
| Acetylenol E13 | | | | | | | | | | | |
| Acetylenol E60 | | | | | | | | | | | |
| Acetylenol E100 | | | | | | | | | | | |
| Oleic Acid | | | | | | | | | | | |
| Ion Exchange Water | 25.97 | 32.97 | 32.97 | 20.97 | 32.97 | 32.97 | 20.97 | 32.97 | 32.97 | 42.50 | 26.00 |
| Dynamic Surface Tension γ10 (mN/m) | 40 | 41 | 41 | 41 | 39 | 39 | 39 | 41 | 41 | 48 | 41 |
| Viscosity η (mPa · s) | 3.7 | 3.9 | 4.0 | 4.3 | 4.0 | 4.0 | 4.3 | 3.9 | 3.9 | 2.9 | 3.6 |

| | Ink | | | | | | | | | |
|---|---|---|---|---|---|---|---|---|---|---|
| | 23 | 24 | 25 | 26 | 27 | 28 | 29 | 30 | 31 | 32 |
| Pigment Dispersion Liquid 1 | 40.00 | 40.00 | 40.00 | 40.00 | 40.00 | 40.00 | 40.00 | 40.00 | 40.00 | 40.00 |
| Pigment Dispersion Liquid 2 | | | | | | | | | | |
| Pigment Dispersion Liquid 3 | | | | | | | | | | |
| Pigment Dispersion Liquid 4 | | | | | | | | | | |
| Glycerin | 15.00 | 15.00 | 15.00 | 15.00 | 15.00 | 15.00 | 15.00 | 15.00 | | 10.00 |
| Triethylene Glycol | 5.00 | 5.00 | 5.00 | 5.00 | 5.00 | 5.00 | 5.00 | 5.00 | | |
| 1,2-Hexanediol | 2.00 | 2.00 | 2.00 | 1.50 | 1.50 | 1.50 | 5.00 | | | 10.00 |
| 2-Pyrrolidoen | | | | | | | | | 5.00 | 7.00 |
| Trimethylolpropane | | | | | | | | | 10.00 | |
| Water Dispersion of Resin Particle 1 | 12.00 | 12.00 | 12.00 | 12.00 | 12.00 | 12.00 | 12.00 | 12.00 | 39.20 | |
| Water Dispersion of Resin Particle 2 | | | | | | | | | | |
| Water Dispersion of Resin Particle 3 | | | | | | | | | | |
| Water Dispersion of Resin Particle 4 | | | | | | | | | | |
| Aqueous Solution of Urethane Resin 1 | | | | | | | | | | |
| Aqueous Solution of Urethane Resin 2 | | | | | | | | | | |
| Aqueous Solution of Block Copolymer 1 | | | | | | | | | | |
| Aqueous Solution of Block Copolymer 2 | | | | | | | | | | |
| Aqueous Solution of Random Copolymer 1 | | | | | | | | | | |
| Aqueous Solution of Random Copolymer 2 | | | | | | | | | | |
| Compound 1 | 1.00 | | | | | | | | | |
| Compound 2 | | 1.00 | | | | | | | | |
| Compound 3 | | | 1.00 | | | | | | | |
| Zonyl FS-3100 | 0.03 | 0.03 | 0.03 | 0.03 | 0.03 | 0.03 | 0.03 | 0.03 | | |
| Acetylenol E13 | | | | 0.20 | | | | | | |
| Acetylenol E60 | | | | | 0.40 | | | | | |
| Acetylenol E100 | | | | | | 0.80 | | | | 1.00 |
| Oleic Acid | | | | | | | | | | 0.20 |
| Ion Exchange Water | 24.97 | 24.97 | 24.97 | 26.27 | 26.07 | 25.67 | 22.97 | 27.97 | 5.80 | 31.80 |
| Dynamic Surface Tension γ10 (mN/m) | 41 | 41 | 40 | 37 | 38 | 38 | 34 | 49 | 49 | 31 |
| Viscosity η (mPa · s) | 4.0 | 4.0 | 4.0 | 3.8 | 3.8 | 3.8 | 4.0 | 3.2 | 3.4 | 4.0 |

<Evaluation>

An ink storage portion (not illustrated) of an ink jet recording apparatus having main portions illustrated in FIG. 5 were filled with each of the inks, and the following evaluations were performed in an environment at a temperature of 25° C. and a relative humidity of 50%. As a recording head, a line-type recording head having a configuration illustrated in FIG. 6 was used. This recording head includes first and second flow paths communicating between an ejection orifice and an ejection element with respect to one nozzle, and flows ink in the first flow path to the second flow path using a pump. The number of nozzles per one row of the nozzles is 1024, a nozzle density is 600 dpi, and an ejection amount of the ink per nozzle is 5 ng. In the following evaluation, a recording medium was conveyed at a speed of 15 inches/sec and an image was recorded under the conditions at which two rows of nozzle rows were used and three droplets of the ink were applied to a unit area (1/600 inches×1/600 inches). Further, a temperature of the ink in the recording head was increased to 40° C.

(Image Unevenness)

Figure 9:
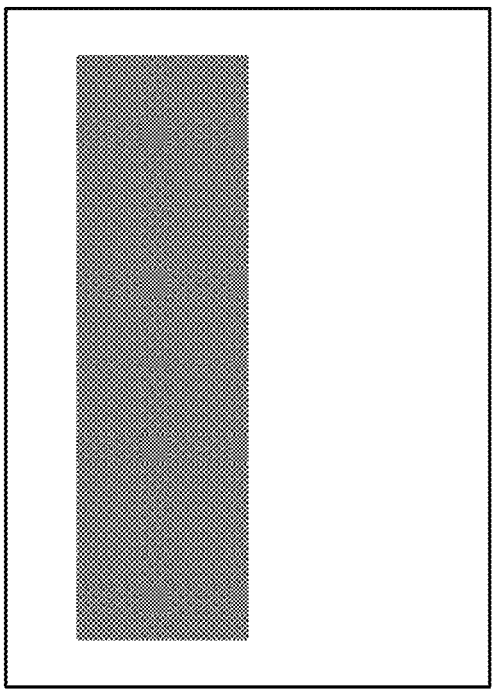
FIG. 9 is a schematic view for explaining a pattern of a solid image recorded in the Example.
Figure 9:
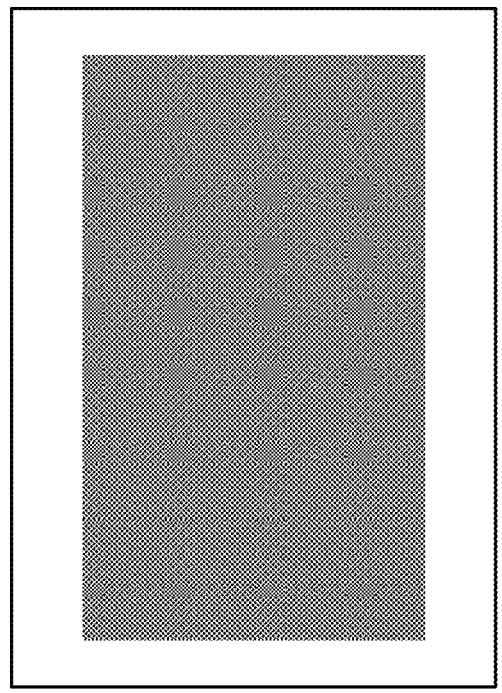

First, a solid image of a "pattern 1" illustrated in FIG. 9 was recorded on 3 sheets of a recording medium using ejection orifices corresponding to a half of the recording medium in a width direction among ejection orifices of the two rows of nozzle rows constituting the line head. As the recording medium, a trade name "high resolution paper HR-101S" (manufactured by Canon Inc.) was used. Next, a solid image of a "pattern 2" illustrated in FIG. 9 was recorded on 1 sheet of the recording medium using ejection orifices corresponding to an entire portion of the recording medium in a width direction among the ejection orifices of the two rows of nozzle rows constituting the line head. The solid images of these two patterns were recorded in the cases in which circulation flow rates of the ink were 1.0 mm/s and 10.0 mm/s, respectively. Further, a solid image recorded under the condition at which a circulation pump was stopped and the ink was not allowed to flow was used as Reference Example 1. The recorded solid image of the "pattern 2" was confirmed by the naked eyes, and image unevenness was evaluated according to evaluation criteria described below. In the present invention, as the evaluation criteria described below, "AA","A" and "B" were set as acceptable levels, and "C" and "D" were set as unacceptable levels. The results are illustrated in Table 5.

AAA: Image unevenness did not occur in any portion of the solid image.
A: Unevenness occurred in a region of 10 dots or less (on an edge portion of the recording medium) after the beginning of ejection.
B: Unevenness occurred in a region of more than 10 dots to 50 dots or less (on the edge portion of the recording medium) after the beginning of ejection.
C: Unevenness occurred in a region of more than 50 dots to 100 dots or less (on the edge portion of the recording medium) after the beginning of ejection.
D: Unevenness occurred in a region of more than 100 dots (on the edge portion of the recording medium) after the beginning of ejection.

TABLE 5

Evaluation conditions and evaluation results

| | | | Image Unevenness | |
| --- | --- | --- | --- | --- |
| | | Ink No. | Circulation Flow Rate 1.0 mm/s | Circulation Flow Rate 10.0 mm/s |
| Example | 1 | 1 | AA | A |
| | 2 | 2 | AA | A |
| | 3 | 3 | AA | A |
| | 4 | 4 | AA | A |
| | 5 | 5 | AA | A |
| | 6 | 6 | AA | A |
| | 7 | 7 | A | B |
| | 8 | 8 | AA | A |
| | 9 | 9 | A | B |
| | 10 | 10 | AA | A |
| | 11 | 11 | AA | A |
| | 12 | 12 | AA | A |
| | 13 | 13 | AA | A |
| | 14 | 14 | AA | A |
| | 15 | 15 | AA | A |
| | 16 | 16 | AA | A |
| | 17 | 17 | AA | A |
| | 18 | 18 | AA | A |
| | 19 | 19 | A | B |
| | 20 | 20 | A | B |
| | 21 | 21 | B | B |
| | 22 | 22 | A | B |
| | 23 | 23 | AA | AA |
| | 24 | 24 | AA | AA |
| | 25 | 25 | AA | AA |
| | 26 | 26 | AA | AA |
| | 27 | 27 | AA | AA |
| | 28 | 28 | AA | AA |
| Comparative Example | 1 | 29 | C | D |
| | 2 | 30 | A | C |
| Reference Example | 1 | 1 | irregular ejection | irregular ejection |
| | 2 | 31 | A | C |
| | 3 | 32 | C | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133624, filed Jul. 7, 2017, and Japanese Patent Application No. 2018-112735, filed Jun. 13, 2018, which are hereby incorporated by reference herein in their entirety.

What is claimed is:

1. An ink jet recording method for recording an image by ejecting ink from a recording head including (i) an ejection orifice for ejecting the ink, (ii) an ejection element generating energy for ejecting the ink, and (iii) first and second flow paths that communicate between the ejection orifice and the ejection element and in which the ink flows, the ink jet recording method comprising:
an ejection step of ejecting the ink from the ejection orifice; and
a flow step of flowing the ink from the first flow path to the second flow path separately from the ejection step,
wherein the ink is an aqueous ink having a dynamic surface tension of 35 mN/m or more to 48 mN/m or less at 10 milliseconds.

2. The ink jet recording method according to claim 1, wherein a viscosity of the ink is 3.0 mPa·s or more.

3. The ink jet recording method according to claim 1, wherein the ink comprises a resin particle.

4. The ink jet recording method according to claim 1, wherein the ink comprises a water-soluble urethane resin.

5. The ink jet recording method according to claim 1, wherein the ink comprises a block copolymer.

6. The ink jet recording method according to claim 1, wherein the ink comprises a polyhydric alcohol derivative in which X mole(s) of ethylene oxide group(s) and Y mole(s) of propylene oxide group(s) are added to a polyhydric alcohol having three or more hydroxy groups and a proportion of $\{Y/(X+Y)\}\times 100(\%)$ is 70% or more to 90% or less.

7. The ink jet recording method according to claim 1, wherein the ink comprises a surfactant.

8. The ink jet recording method according to claim 7, wherein the surfactant comprises a compound represented by the following General Formula (1):

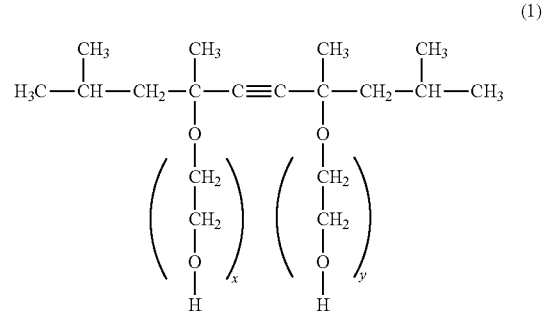

wherein, in General Formula (1), x and y are each the number of added ethylene oxide groups.

9. The ink jet recording method according to claim 1, wherein the recording head comprises a plurality of ejection orifices, a plurality of first flow paths, and a plurality of second flow paths,
wherein each of the plurality of the first flow paths communicates with an inlet path, and
wherein each of the plurality of the second flow paths communicates with an outlet path.

10. The ink jet recording method according to claim 1, wherein the flow step comprises flowing the ink from the first flow path to the second flow path without discharging the ink from the ejection orifice.

11. The ink jet recording method according to claim 1, further comprising a recovery step of the recording head,
wherein, during the recovery step, the flow step is stopped.

12. The ink jet recording method according to claim 1, wherein, in the flow step, the ink flows in a direction that crosses the ink-ejecting direction.

13. The ink jet recording method according to claim 1, wherein the flow step comprises flowing the ink from the first flow path to the second flow path by a flowing unit separate from the ejection element.

14. The ink jet recording method according to claim 1, wherein the flow step comprises flowing the ink from the first flow path to the second flow path by a pressure difference.

15. The ink jet recording method according to claim 14, wherein a flow rate (mm/s) of the ink is 0.1 mm/s or more to 10.0 mm/s or less.

16. The ink jet recording method according to claim 1, wherein the flow step comprises flowing the ink intermittently from the first flow path to the second flow path.

17. The ink jet recording method according to claim 16, wherein a flow rate (mm/s) of the ink is 1.0 mm/s or more to 10.0 mm/s or less.

18. The ink jet recording method according to claim 1, wherein the recording head is a line head.

19. The ink jet recording method according to claim 18, wherein the line head has a plurality of ejection element substrates arranged in a linear shape.

20. An ink jet recording apparatus comprising:
a recording head including an ejection orifice for ejecting the ink, (ii) an ejection element generating energy for ejecting the ink, and (iii) first and second flow paths that communicate between the ejection orifice and the ejection element and in which the ink flows; and
a flowing unit for flowing the ink from the first flow path to the second flow path separately from the ejection element,
wherein the ink is an aqueous ink having a dynamic surface tension of 35 mN/m or more to 48 mN/m or less at 10 milliseconds.

* * * * *